United States Patent [19]

Nakayama et al.

[11] Patent Number: 4,947,448
[45] Date of Patent: Aug. 7, 1990

[54] IMAGE INFORMATION SIGNAL TRANSMITTING SYSTEM

[75] Inventors: Tadayoshi Nakayama, Yokohama; Chikara Sato; Kenichi Nagasawa, both of Kawasaki; Tomohiko Sasatani; Koji Takahashi, both of Yokohama; Susumu Kozuki, Tokyo; Katsuji Yoshimura, Kawasaki, all of Japan

[73] Assignee: Canon Kabushiki Kaisha, Tokyo, Japan

[21] Appl. No.: 274,660

[22] Filed: Nov. 21, 1988

[30] Foreign Application Priority Data

| Nov. 22, 1985 | [JP] | Japan | 60-263079 |
| Nov. 22, 1985 | [JP] | Japan | 60-263081 |
| Nov. 22, 1985 | [JP] | Japan | 60-263083 |
| Nov. 22, 1985 | [JP] | Japan | 60-263084 |

[51] Int. Cl.$^5$ ............................................. G06K 9/00
[52] U.S. Cl. ..................................... 382/56; 358/136
[58] Field of Search ................. 382/56; 358/133, 135, 358/136, 426, 262.1

[56] References Cited

U.S. PATENT DOCUMENTS

| 3,580,999 | 5/1971 | Mounts | 358/136 |
| 3,603,725 | 9/1971 | Cutler | 358/136 |
| 3,749,829 | 7/1973 | Burns et al. | 358/136 |
| 4,090,221 | 5/1978 | Connor | 358/136 |
| 4,155,097 | 5/1979 | Lux | 358/135 |
| 4,597,010 | 6/1986 | Carr | 358/135 |
| 4,633,326 | 12/1986 | Endoh et al. | 382/56 |

Primary Examiner—Leo H. Boudreau
Attorney, Agent, or Firm—Robin, Blecker, Daley & Driscoll

[57] ABSTRACT

An image information signal transmitting system for transmitting an image information signals which continuously forms a temporally correlated group of image planes is arranged to divide each image plane portions of the image information signal into a plurality of blocks; and, in determining for every divided block included in each of the image planes the adoption of one of a plurality of information transmitting modes provided for different information transmitting density values, the information transmitting modes for the plurality of blocks of a presently transmitting image plane portion of the signal are determined at least according to the information transmitting modes which hae been used for the plurality of blocks of a previously transmitted image plane portion of the signal.

10 Claims, 13 Drawing Sheets

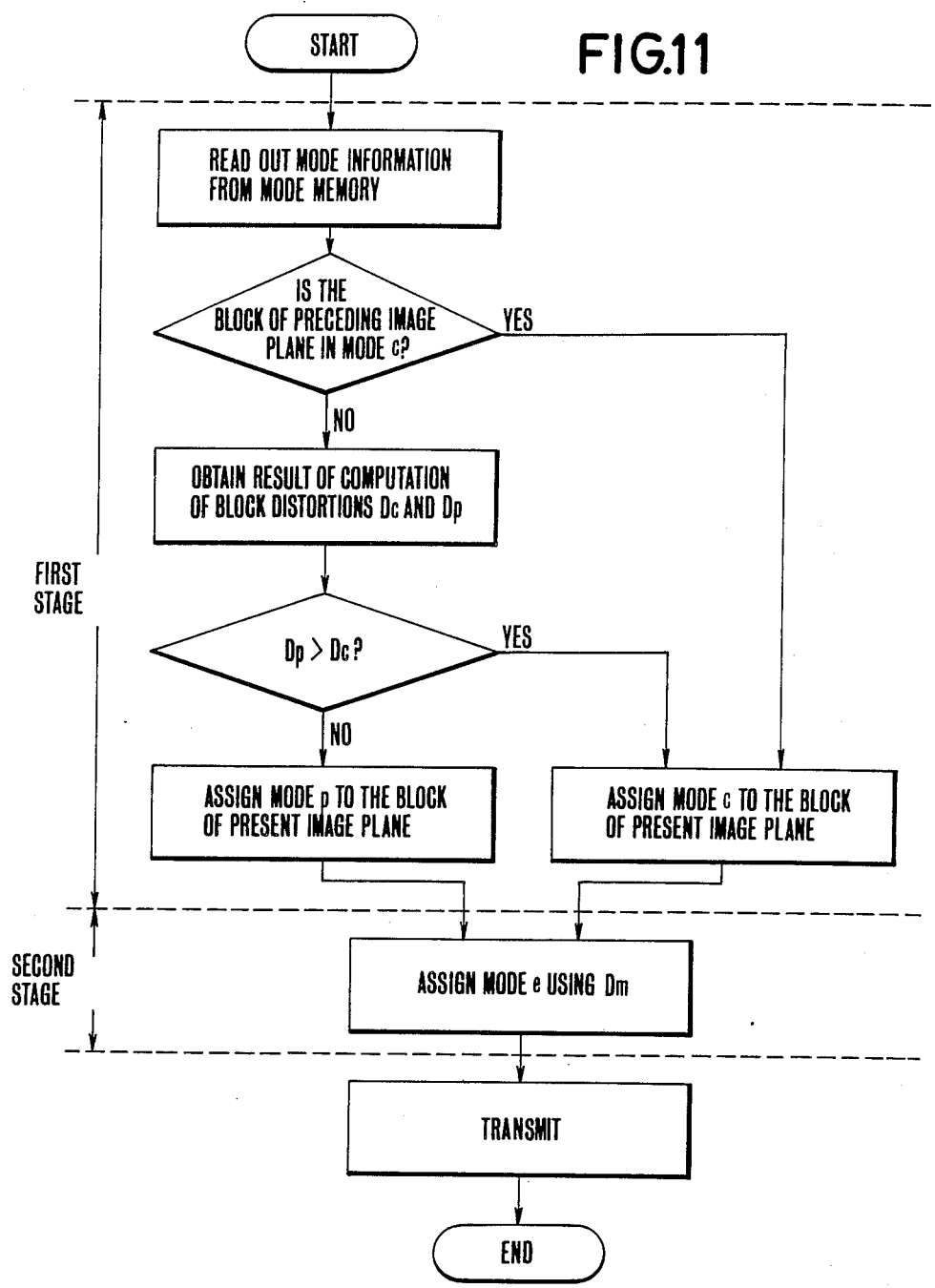

FIG.12(A)

| MODE ASSIGNED TO PRECEDING IMAGE PLANE | PICTURE ELEMENT DATA OF PRECEDING IMAGE PLANE STORED AT FRAME MEMORY |
|---|---|
| c | NOT READ OUT |
| e | READ OUT |
| p | READ OUT |

FIG.12(B)

| MODE ASSIGNED TO PRECEDING IMAGE PLANE | PICTURE ELEMENT DATA OF PRECEDING IMAGE PLANE COMING TO FRAME MEMORY |
|---|---|
| c | NOT WRITTEN IN |
| e | WRITTEN IN |
| p | NOT WRITTEN IN |

——— Db DISTRIBUTION IN TRANSMITTING
- - - - Db DISTRIBUTION IN RECEIVING

IMAGE INFORMATION SIGNAL TRANSMITTING SYSTEM

This application is a continuation, of application Ser. No. 932,662, filed Nov. 19, 1986 now abandoned.

BACKGROUND OF THE INVENTION:

1. Field of the Invention:

This invention relates to an image information transmitting system and more particularly to a system for continuously transmitting a temporally correlated group of image planes.

2. Description of the Related Art:

In transmitting information such as image information, it is always the theme of efforts to reproduce the original information with a higher degree of fidelity with a smaller amount of transmitting information. Hence, varied kinds of transmission methods have been proposed for this purpose.

These methods include adaptive type variable density sampling methods of appropriately changing sampling density, that is, varying the density of information being transmitted. An example of this method has been disclosed and known by the name of a time axis transforming band compressing method (hereinafter referred to as TAT method). The TAT method is briefly described below:

FIG. 1 of the accompanying drawings shows the fundamental concept of the TAT method. An original signal is divided as indicated by broken lines into blocks by a predetermined period of time. The information contained in the original signal within each divided block is checked to discriminate its degree of density. When any of the blocks is thus found to be dense, data obtained by sampling the original signal of the block is completely transmitted as transmitted data. For a block determined to be sparse, only a portion of data is transmitted while the rest is regarded as thinned-out data and is not transmitted.

The arrangement according to this concept decreases the amount of data to be transmitted per unit time and thus permits the transmitted signal to be band compressed. The data thus transmitted is used by the receiving side for forming data corresponding to the thinned-out data. In other words, some interpolation data which is in proximity to the thinned-out data is obtained by computation by using the transmitted data. Since the interpolation data corresponds to a sparse part of the information signal, it is in close proximity to the thinned-out data. Compared with a case where the whole data is transmitted, the interpolating arrangement gives a restored signal with a fairly high degree of fidelity to the original signal while the transmission band can be reduced to a great degree by the arrangement. In other words, the amount of information to be transmitted is reduced by the arrangement.

Meanwhile, the elaborateness or fineness of the original signal within each of the divided blocks are examined in making a discrimination between transmitting the whole sampling data and transmitting just a portion thereof. Information on the result of this discrimination is also transmitted along with the transmitted data as transmission mode information.

In the case of image information, transmission according to the above-stated concept is performed in the following manner: The image information has a two-dimensional spread and has a correlativity between horizontal and vertical directions. Therefore, transmission of image information can be more effectively accomplished by arranging the intervals of sampling to be variable not only in the horizontal direction but also in the vertical direction. This idea will be called the two-dimensional TAT method. The following is the brief description of the two-dimensional TAT method:

FIG. 2 is a data transmission pattern of the two-dimensional TAT method. In this method, one picture plane is divided into a plurality of picture element blocks. Each of the divided blocks consists of an m X n number of picture elements. The transmitted data density of one picture element block is arranged to be variable from another and independently of another. In the case of FIG. 2, each picture element block consists of 4 X 4 picture elements and is arranged to be transmissible in two different transmission modes. In FIG. 2, each mark ◯ represents a picture element to be transmitted and another mark "X" a picture element to be thinned out. A reference symbol E denotes a transmission pattern in which data of all the picture elements is transmitted; and another symbol C a pattern in which only a portion of data of all the picture elements within one block is transmitted. Hereinafter, the mode of transmission in the former pattern will be called the E mode and transmission in the latter the C mode respectively. As apparent from the illustration, data is transmitted in the C mode with ¼ of the information transmitting density of the E mode. In the case of the C mode, the original image plane is restored by forming interpolating picture element data for each of the thinned-out picture elements on the basis of the transmitted data representing a picture element located near to the thinned-out one within the same picture element block. A system for carrying out the two-dimensional TAT method is arranged as described below with reference to FIG. 3:

FIG. 3 is a block diagram showing by way of example an analog transmission system. An incoming image signal is sampled for all the picture elements thereof by an analog-to-digital (hereinafter referred to A/D) converter 1. By this, data for all the picture elements is generated. This all-picture-element data is supplied to a thinning-out circuit 2. The thinning-out circuit 2 performs a thinning-out operation in a manner corresponding to the C mode pattern shown in FIG. 2. The circuit 2 thus produces C mode picture element data. The C mode picture element data is supplied to an interpolation circuit 3, which performs computing operation to obtain interpolation picture element data corresponding to the thinned-out picture elements. The interpolation picture element data is supplied to a mode discrimination circuit 4 together with the all-picture-element data produced from the A/D converter 1. Then, each picture element block is determined whether it is to be transmitted in the C mode or in the E mode. At the mode discrimination circuit 4, computation is performed for each of the picture element blocks to obtain a difference between the picture element data produced from the A/D converter 1 and the interpolation picture element data. The sum of the difference (hereinafter referred to as a block distortion) is computed for every picture element block and then a total difference thus obtained for one field portion of the signal is stored in a memory.

Before arrival of the data of a next field, the distribution of block distortions of all the picture element blocks is thus obtained. In this instance, the ratio of the number of picture element blocks to be transmitted in the C mode to that of the picture element blocks to be transmitted in the E mode must be arranged to be unvarying to fix the rate of compression. For example, assuming that $\frac{2}{3}$ of all the picture element blocks are to be transmitted in the C mode and $\frac{1}{3}$ of these blocks to be transmitted in the E mode, a total number of transmission data (or the rate of compression) becomes ($\frac{2}{3} \times \frac{1}{4} + \frac{1}{3} \times 1 =)\frac{1}{2}$. Therefore, in accordance with the distribution of the block distortion covering all the picture element blocks, a threshold value of distortion is predetermined for determining a boundary between the C mode and the E mode.

Following this, at the time of arrival of the incoming image signal for the next field, the stored block distortion values are read out one after another and compared with the threshold value to determine thereby the transmission mode to be selected. In case that the read out distortion value coincides with the threshold value, the transmission mode is determined in such a manner that the number of the picture element blocks to be transmitted in the C mode and that of the blocks to be transmitted in the E mode are in the predetermined ratio. The mode discrimination circuit 4 produces a mode discrimination signal representing the determined transmission mode.

The mode discrimination signal which is thus obtained in the above-stated manner is supplied to a switch 7. Then, the picture element data is selectively read out from a buffer 5 which is provided for the picture element data of the E mode and a buffer 6 which is for the picture element data of the C mode. The output of the switch 7 is supplied as the transmission data to a digital-to-analog (D/A) converter 8 to be converted back into an analog picture element signal. This signal is then produced to a transmission line. Further, the mode discrimination signal is also produced to the transmission line via a buffer 9 as a mode information signal.

FIG. 4 shows in outline the arrangement of the receiving side of the two-dimensional TAT transmission system. The picture element signal which has been processed in the manner as described in the foregoing and supplied via the transmission line is received at an A/D converter 10 to be converted back into a digital picture element data. The output of the A/D converter 10 is supplied to a C mode interpolation circuit 11. The circuit 11 performs a computing operation to obtain interpolation data corresponding to the thinned-out picture element data in the C mode.

Meanwhile, the transmitted mode discrimination signal or mode information signal controls a switch 12. The connecting position of the switch 12 is shifted to its one side E when the signal indicates the E mode and to the other side C thereof when the signal indicates the C mode. Through this switch 12, the whole picture element data including the E mode picture element data, the C mode picture element data and the interpolation picture element data is stored gradually at a frame memory 13. The stored data is read out from the frame memory 13 in a sequence, for example, according to a television signal. The read out data is produced via a D/A converter 14 to become an image signal.

As described above, the image information can be effectively transmitted by the transmission system operating according to the two-dimensional TAT method. However, when a television signal which is obtained in the manner described above is displayed, deterioration becomes conspicuous in resolution in a still picture region although the resolution is acceptable in a motional picture region. Meanwhile, in the still region on the image plane, there is a high correlativity in the time axial direction. A method of utilizing this correlativity in the time axial direction has recently advanced.

However, in the transmission system of the above-stated two-dimensional TAT method, image planes having temporal correlation among them is arranged to be continuously transmitted even for a still picture part having a high degree of temporal correlation without making any distinction between still part and a motional part of each image plane during the continuous transmission of a temporally correlated group of image planes. Therefore, in the event of a still picture part having an extremely high degree of correlativity among image planes on the time base, transmission of similar image information signals are uncecessarily repeated many times. This results in a very poor transmission efficiency.

Further, to solve this problem, it is conceivable to have an additional transmission mode in which a group of image planes is transmitted by utilizing the correlativity of images in the time base direction. In that event, however, the increase in the number of transmission modes inevitably causes an increase in the amount of transmission mode information to be transmitted.

SUMMARY OF THE INVENTION

It is a general object of this invention to provide an image information signal transmission system capable of solving the above-stated problems of the prior art.

It is a more specific object of this invention to provide an image information signal transmission system capable of performing efficient transmission by determining a transmission mode for an image plane portion of the image information signal to be next transmitted according to a transmission mode used for another image plane portion of the image information signal already transmitted.

Under this object, an image information signal transmitting system which is arranged according to this invention as an embodiment thereof to transmit an image information signal which continuously forms a group of image planes having temporal correlativity among them comprises: dividing means for dividing each image plane portion of the image information signal into a plurality of blocks; information transmitting mode determining means for determining, for every divided block included in each of the image planes, the adoption of one of a plurality of information transmitting modes provided for different information transmitting density values; and determining action control means for controlling the determining action of the information transmitting mode determining means to have one of the information transmitting modes determined for each of the plurality of blocks of a presently transmitting image plane portion of the signal determined at least according to the information transmitting modes which have already been determined by the information transmitting mode determining means for the plurality of blocks of the previous image plane.

It is another object of this invention to provide an image information signal transmitting system which is capable of performing a transmitting operation with improved efficiency by skipping a part of the image information signal by utilizing a part of an image plane portion of the image information signal previously transmitted.

Under that object, an image information signal transmitting system which is arranged according to this invention as another embodiment thereof to transmit an information signal which continuously forms a group of image planes having temporal correlativity among them comprises: storing means arranged to store every one-image-plane portion of the image information signal and to be capable of producing each of said plurality of one-image-plane portions by dividing it into a plurality of blocks; and information transmitting mode determining means arranged to determine, for each of the plurality of blocks of every image plane, one of a plurality of information transmitting modes provided for different information transmitting density values including a mode in which a present image plane portion of the image information signal is not transmitted and to supply a rewriting control signal to the storing means to cause the latter not to write in the image information signal at least for the blocks allocated to the information transmitting mode not transmitting the present image plane portion of the image information signal among all the blocks stored at said storing means.

It is a further object of this invention to provide an image information signal transmitting system which, in transmitting an image information signal in a transmitting mode utilizing the temporal correlativity of the image information signal, is capable of transmitting the signal without necessitating transmission of any additional information signal for indicating the above-stated transmission mode. To attain this object, an image information transmitting system arranged according to this invention as a further embodiment thereof to transmit an image information signal continuously forming a temporally correlated image planes comprises:

A transmitting device including dividing means for dividing each image plane portion of the image information signal into a plurality of blocks; first transmitting means which is capable of transmitting the image information signal for each of the plurality of blocks obtained by the dividing means in a first degree of information density; second transmitting means which is capable of transmitting the image information signal for each of the plurality of blocks in a second degree of information density which is lower than the first degree of information density; information transmitting mode determining means which is arranged to detect the degree of the temporal correlativity of the image information signal for each of the plurality of blocks obtained by the dividing means and to determine in accordance with the detected degree of correlativity whether each of the plurality of blocks is to be transmitted by the first transmitting means or to be transmitted by the second transmitting means; and transmitting means arranged to generate a transmission mode signal indicative of the transmitting means employed for transmitting the image information signal and to transmit the transmitting mode signal along with the image information signal. The system further comprises:

A receiving device including interpolating means arranged to perform, according to the transmitting mode signal received from the transmitting means, an information signal interpolating process on the image information signal which is transmitted in the second information density by the second transmitting means and to produce the interpolated image information signal; first storing means arranged to be capable of storing each one-image-plane portion of the image information signal produced from said interpolating means; first thinning-out means arranged to perform an information thinning-out process according to the transmitting mode signal from the transmitting means on the image information signal transmitted in the first degree of information density by the first transmitting means; second storing means arranged to be capable of storing each one-image-plane portion of the image information signal produced from said first thinning-out means; first correlativity data generating means arranged to detect, for every block, a degree of correlativity between the present image plane portion of the image information signal produced from the first thinning-out means and the preceding image plane portion of the image information signal stored at the second storing means and to generate first correlativity data for every block according to the detected degree of correlativity; and writing control means arranged to control, for every block, image information signal writing actions on the first and second storing means by using the transmitting mode signal received from the transmitting means and the first correlativity data generated by the first correlativity data generating means.

It is a further object of this invention to provide an image information signal transmitting system which is capable of stably transmitting an image information signal in one of transmission modes utilizing the temporal correlativity thereof without necessitating transmission of any additional information signal for indicating the transmitting mode employed and without being affected by any distortion and noises arising in a transmission line. To attain that object, an image information transmitting system arranged according to this invention as a further embodiment thereof to transmit an image information signal which continuously forms a temporally correlated image planes comprises: dividing means for dividing each image plane portion of the incoming image information signal into a plurality of blocks; first storing means arranged to store the image information signal of image planes already received by dividing the signal into one-image-plane portions and by further dividing each image-plane portion of the signal into a plurality of blocks; first transmitting means arranged to be capable of transmitting the image information signal for each of the plurality of blocks in a first degree of information density; second transmitting means arranged to be capable of transmitting the image information signal for each of the plurality of blocks obtained from the dividing means in a second degree of information density which is lower than the first degree; third transmitting means arranged to be capable of transmitting for each of the plurality of blocks the image information signal stored at the first storing means; information transmitting mode determining means arranged, for each of the plurality of blocks obtained by the dividing means, to detect the degree of correlativity of the image information signal and to determine whether the image information signal is to be transmitted by the first transmitting means or by the second transmitting means or whether the signal is to be transmitted by the third transmitting means; and transmitting means arranged to generate a transmitting mode signal indicative of whether the image information signal is transmitted by the transmitting means in the first degree of information density or in the second information density determined by the information transmitting mode determining means and to transmit the transmitting mode signal along with the image information signal.

The above and other objects and features of the invention will become apparent from the following detailed description of embodiments thereof taken in connection with the accompanying drawings.

BRIEF DESCRIPTION OF THE DRAWINGS

FIG. 11 is a flow chart showing the operation of a mode discrimination circuit of the first embodiment of this invention arranged to make mode allocation by utilizing the transmitting mode employed for a preceding image plane.

FIG. 12(A) shows a relation between information on each mode assigned to a preceding image plane and a reading action on a frame memory.

FIG. 12(B) shows a relation between information on each mode assigned to the present image plane and a writing action on the frame memory.

DETAILED DESCRIPTION OF THE PREFERRED EMBODIMENTS

A transmission system described here as a first embodiment of this invention employs the two-dimensional TAT method mentioned in the foregoing and, in addition to that, is arranged to reduce the number of transmitting data by utilizing the temporal correlativity of the image information. The embodiment, therefore, may be called a three-dimensional TAT system. In the case of this three-dimensional TAT system, picture quality is arranged to be further increased with the same amount of data transmitted as in the case of the two-dimensional TAT method by taking the advantage of the fact that the receiver side of the system is not required to renew picture element data for the still or unmoving parts of the image planes. The basic concept of this embodiment is as follows: With regard to the picture element data included in a still picture part, once all the picture element data of an image plane is transmitted, the still picture element data block in the ensuing image planes is not transmitted in transmitting the ensuing image planes and the data transmitted is used repeatedly for the ensuing image planes. The transmitting mode in which the picture element data of an image plane previously transmitted is no longer transmitted and is skipped over hereinafter will be called the mode p. Further, for distinction from the two-dimensional TAT method, the transmitting modes which correspond to the modes E and C of the two-dimensional TAT method hereinafter will be called the modes e and c respectively.

In transmitting the same amount of data as in the case of the two-dimensional TAT method, the arrangement to increase the number of picture element blocks to be transmitted in the mode p enables high information density picture element blocks among the remaining picture element blocks to be transmitted in the mode e. Therefore, on the side of the signal receiver, the number of picture element blocks giving a high degree of resolution can be increased according as the still picture area increases. This permits further improvement in the reproduced picture quality.

Figure 1:
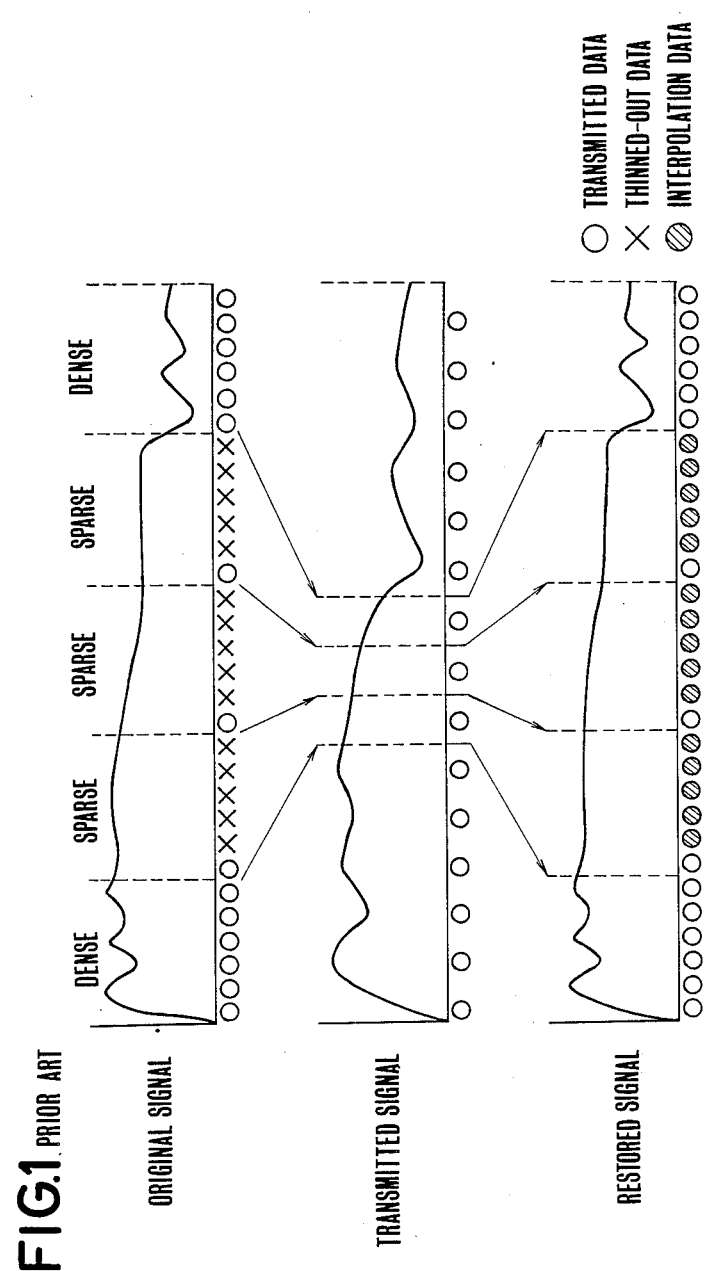
FIG. 1 is an illustration of the basic concept of the TAT method.
Figure 2:
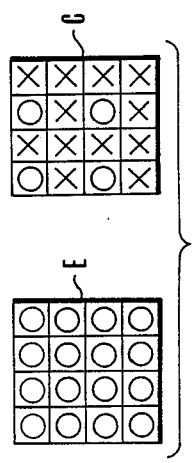
FIG. 2 is an illustration of the data transmitting pattern of the two-dimensional TAT method.
Figure 3:
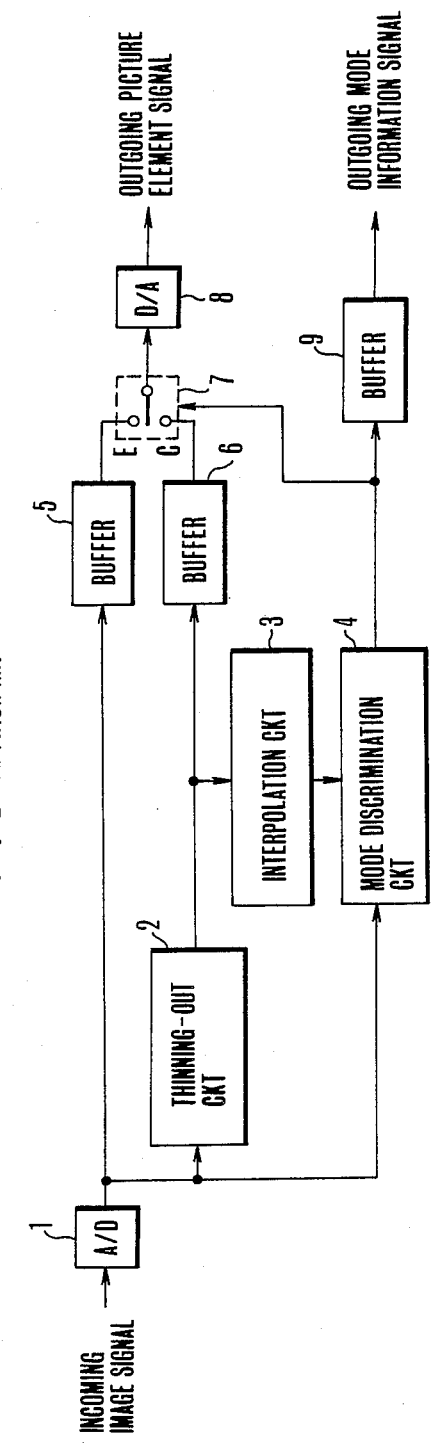
FIG. 3 is a block diagram showing in outline the arrangement of the transmitter side of a transmission system embodying the two-dimensional TAT method.
Figure 4:
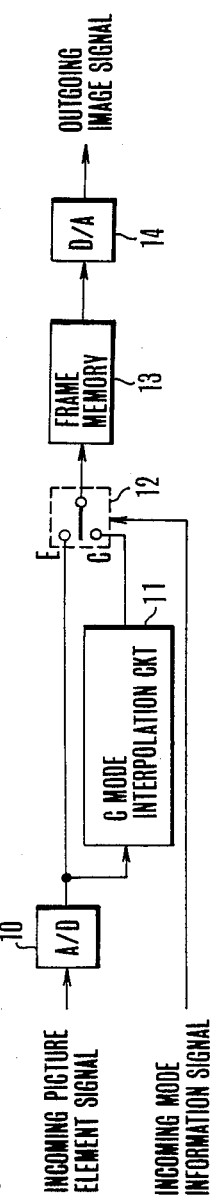
FIG. 4 is a block diagram showing in outline the arrangement of the receiver side of the same transmission system.
Figure 5:
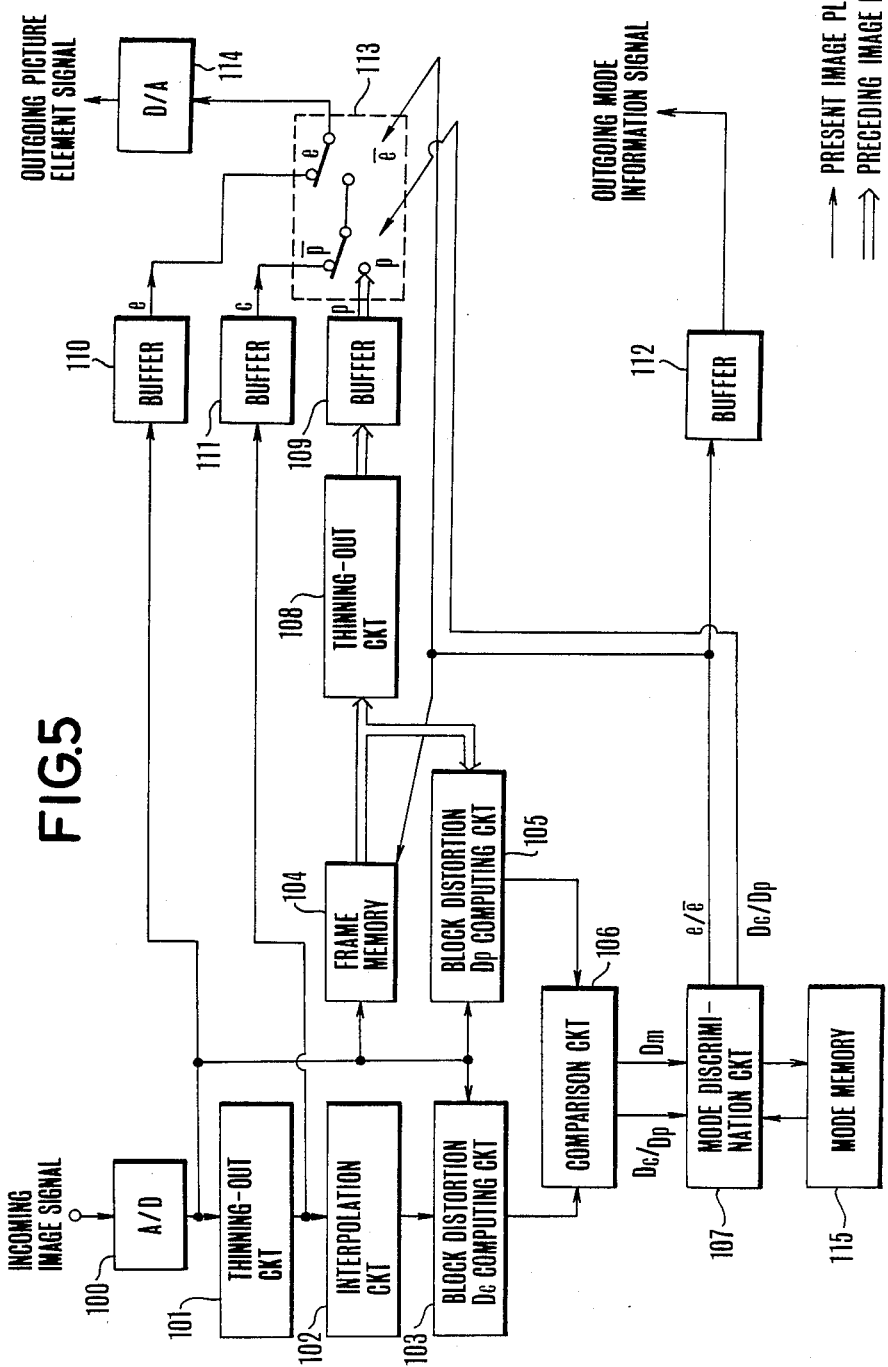
FIG. 5 is a block diagram showing in outline the arrangement of the transmitter side of a transmission system arranged as a first embodiment of this invention.

FIG. 5 shows in outline the arrangement of the transmitter of a transmission system arranged as the first embodiment of this invention. In this case, the invention is applied to an analog transmission system. In FIG. 5, the data of a preceding image plane is indicated by double lines and that of a present image plane by a single line. An incoming analog image or video signal is converted into a digital signal by an analog-to-digital converter 100 (hereinafter referred to as A/D converter). By this, the whole picture element data is produced. Like in the case of the two-dimensional TAT method, the whole picture element data is supplied to a thinning-out or skipping circuit 101. The circuit 101 performs a thinning-out process corresponding to the C mode pattern. By this process, picture element data in the mode c, i.e. basic picture element data, is obtained. The mode c picture element data is supplied to an interpolation circuit 102, which performs a computing operation for obtaining interpolating picture element data corresponding to the skipped or thinned out data.

A process of determining one of the three modes e, c and p to be employed in transmitting each picture element block is arranged to be performed as follows: The process can be roughly divided into two stages. In the first stage, a difference in the reproduced picture element data between the mode e transmission and the mode c transmission is computed by using the output of the A/D converter 100 and the output of the interpolation circuit 102 in the same manner as in the case of the two-dimensional TAT method. A total of this difference for each picture element block (hereinafter referred to as block distortion Dc) is then computed by a block distortion Dc computing circuit 103. Meanwhile, a difference between each picture element data of a previously transmitted image plane stored at a frame memory 104 and that of the present image plane is computed. A total of this difference for every picture element block (hereinafter referred to as block distortion Dp is likewise computed by a block distortion Dp computing circuit 105. Then, the block distortion Dc and the block distortion Dp are compared by a comparator 106.

In other words, the comparator 106 detects, for every picture element block, which of the mode c transmission and the mode p transmission is capable of reproducing an image plane with better fidelity relative to an image plane reproducible by mode e transmission. In the case of Dc>Dp, the mode c is not employed. The mode p is not employed in the case of Dc<Dp. The comparator 106 produces data (Dc/Dp) indicative of which of the distortion values Dc and Dp is larger and, along with it, also supplies information on the smaller value as a composite block distortion Dm to a mode discrimination circuit 107.

In the second stage, the mode e is allocated at the mode discrimination circuit 107 to a predetermined number of picture element blocks one after another in the order of larger Dm value. In the same manner as in the case of the two-dimensional TAT method, this allocation or assigning process is carried out in the following manner: A threshold value of the composite block distortion Dm is first obtained on the basis of the distribution of the distortion Dm among all the picture element blocks. The mode e is assigned to the picture element blocks having higher values of Dm than the threshold value. The modes other than the mode e are assigned when the value Dm is smaller than the threshold value. With the value Dm not exceeding the threshold value, the mode c is assigned if Dp>Dc and the mode p if Dp<Dc. The mode discrimination circuit 107 then produces along with the above-stated data Dc/Dp data e/ē indicative of whether the mode e or the mode other than the mode e is assigned.

Figure 10:
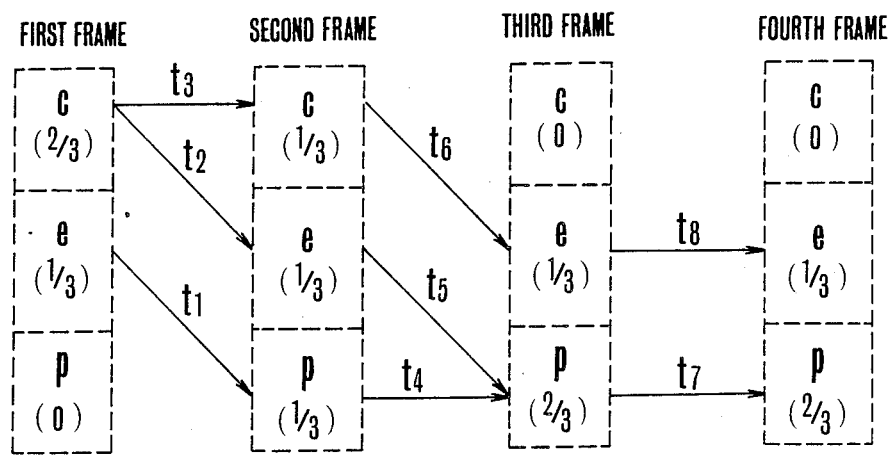
FIG. 10 is an illustration showing changes in modes when the whole image plane is a still picture area.

The following description shows how the transmitting mode varies with the image to be transmitted and how the information on the transmitting mode previously allocated is utilized in determining information on the transmitting mode to be employed:

The effect of the three-dimensional TAT processing system is most advantageously attainable in the case of a still picture, i.e. in cases where the whole image plane area remains still and motionless over several frames. FIG. 10 shows by way of example a pattern of variations of transmitting modes taking place in the case of a still picture in each image plane from the first frame obtained at the rise of the system until completion of high precision transmission of the whole area. In FIG. 10, each parenthesized figure under a mode indication shows the ratio of blocks allocated to each transmitting mode to the whole image plane. In the first frame, the mode p is assigned to no block because no information has been transmitted before that. Therefore, like in the case of the two-dimensional TAT method, the mode c is assigned in the ratio of ⅔ and the mode e in the ratio of ⅓ for the first frame.

In the second frame, since the whole of the first frame is a still picture in this instance, the blocks allocated to the mode e in the first frame change to be in the mode p as indicated by an arrow t1 in FIG. 10. Then, for the second frame, the mode e can be assigned to an area which is not allocated to the mode e in the first frame.

In other words, for some of the blocks which are transmitted in the mode c for the first frame, the mode e is assigned to them one after another in the order of larger value Dc in such a manner that ⅓ of all the blocks of the image plane is transmitted in the mode e during the second frame transmitting period as indicated by an arrow t2. Meanwhile, the rest of the blocks which are transmitted in the mode c for the first frame remain in the mode c for the second frame as indicated by an arrow t3.

In the third frame, the blocks to which the mode c is assigned in the second frame (⅓ of all the blocks) change to be in the mode e as indicated by an arrow t6. In other words, the mode p remains unchanged as indicated by an arrow t4; the mode e changes to the mode p in the same manner as in the case of the second frame as indicated by an arrow t5. Thus, ⅔ of all blocks are allocated to the mode p while the remaining ⅓ change their mode from the mode c to the mode e. Through these steps, in the fourth frame, all the blocks come to be reproduced with a high degree of precision either in the mode e or in the mode p. If the state of the still picture continues for the frames ensuing the fourth frame, the image planes are transmitted with the modes p and e remaining unchanged from the state as indicated by arrows t7 and t8 in FIG. 10.

With the mode in which the present image plane is to be transmitted determined according to the transmitting mode employed for the preceding image plane as described above, transmission can be accomplished with a high degree of efficiency.

FIG. 11 is a flow chart showing by way of example the operation of the mode discrimination circuit 107 which is thus arranged to determine the allocation of the modes by utilizing the transmitting modes used for the preceding image plane. Referring to FIG. 11, it is during a first stage of process that the transmitting modes for the present image plane are determined on the basis of the mode information on the preceding image plane. In a second stage of process, the operation is performed in about the same manner as in the two-dimensional TAT method with the exception of that: In this instance, in assigning the mode e, the block distortion Dm is used in place of the block distortion Dc as mentioned in the foregoing.

More specifically, after the process for the second frame as shown in FIG. 10, the mode discrimination circuit 107 compares the block distortion Dp with the block distortion Dc for the blocks transmitted either in the mode e or in the mode p in the first stage of FIG. 11. The mode c or the mode p is assigned to these blocks according to the result of comparison. For the blocks to which the mode c is assigned for the first frame, the mode c is assigned. Then, in the second stage of FIG. 11, the mode e is assigned in accordance with the composite block distortion Dm.

The mode assigning or allocating operation shown in the flow chart of FIG. 11 is accomplished by using the mode memory 115 which is shown in FIG. 5. The mode memory 115 is arranged to store one frame portion of mode information for every block. The mode information on the frame for which the mode allocation has been completed is written in the memory 115 one from after another beginning with the first frame. In determining the mode, the mode information on the preceding image plane is first read out from the mode memory 115 to discriminate the mode. If the read out mode information indicates either the mode e or the mode p, the assignment of the mode p or the mode c to the present image plane is determined according to the result of comparison made between the block distortions Dc and Dp which is received from the comparator 106. Following this, the assignment of the mode e is determined according to the value of the composite block distortion Dm which comes also from the comparator 106. The mode information determined in this manner is supplied to the mode memory 115 to renew the contents of the memory 115 accordingly.

In the transmitting system of this specific embodiment, the above-stated data $e/\bar{e}$ is alone transmitted. At that time, information indicating whether the picture element transmitting mode other than the mode e is the mode c or the mode p is transmitted as picture element data in the following manner:

For a picture element block to be transmitted in the mode p, the basic picture element data of the preceding image plane which is reproduced on the side of the receiver is not transmitted. Further, the whole picture element data of the preceding image plane reproduced on the receiver side is stored at the frame memory 104. The stored whole picture element data is thinned out by the thinning-out or skipping circuit 108 in the same manner as the thinning-out circuit 101. The basic picture element data of the preceding image plane is obtained in this manner. Hereinafter the data thus obtained from the thinning-out circuit 108 will be called the mode p picture element data. On the side of the receiver, as will be mentioned later, if any picture element block continues to have the same basic picture element data among consecutively incoming image planes, the picture element block corresponding to that specific block in the ensuing image plane is regarded as to have been transmitted in the mode p.

The data stored at the frame memory 104 is the whole picture element data of the preceding image plane to be reproduced on the side of the receiver. Therefore, with regard to the picture element data of a picture element block which is in the mode p in the preceding image plane, a rewriting action on the data of the memory 104 must be inhibited. Further, assigning the mode p to a picture element block which has been in the mode c in the preceding image plane gives no picture quality improving effect. Therefore, the data rewriting action on the frame memory 104 is necessary only when the mode discrimination circuit 107 detects the mode e. In the case of this embodiment, therefore, the rewriting action on the memory 104 is controlled according to the data $e/\bar{e}$ obtained from the mode discrimination circuit 7.

The details of the actions to write and read into and out of the frame memory 104 are as follows: These actions are controlled in different manners for the different modes according to the mode information on the preceding image plane stored at the mode memory 115 and the mode information on the modes allocated to the present image plane by the mode discrimination circuit 107. However, since any mode changing pattern that either does not improve the quality of the image to be transmitted or lowers the transmission efficiency is inhibited as mentioned above, any block that has been allocated to the mode c is never reallocated to the mode p for the present image plane. In other words, the block to be allocated to the mode e for the present image plane is either allocated to the mode p or the mode e in the preceding image plane. The allocation of the mode p is determined by the mode discrimination circuit 107 according to the block distortions Dp and Dc as mentioned above. Therefore, in reading out the picture element data of the preceding image plane from the frame memory 104 for the purpose of computing the block distortions Dp and Dc, the picture element data reading manner varies with the mode information on the preceding image plane as shown in FIG. 12(A).

FIG. 12(A) shows a correlation between the mode information on the preceding image plane and actions to be performed on the picture element data stored at the frame memory 104. As shown, data is read out from the frame memory 104 according to the mode information about the preceding image plane and the modes are assigned to the blocks of the present image plane in the manner as mentioned above. Further, as shown in FIG. 12(A), no data is read out from the frame memory 104 when the mode information on the preceding image plane is indicative of the mode c. In that event, therefore, the value of the block distortion Dp becomes larger at the comparator 106 and the mode p is never assigned for the present image plane.

The picture element data of the present image plane is written into the frame memory 104 according to the mode information on the present image plane determined in the above-stated manner.

FIG. 12(B) shows the correlation between the mode information on the present image plane and a writing action on the picture element data of the present image plane into the frame memory 104. As shown, the picture element data of the present image plane is not written in the frame memory 104 with the exception of any block of the present image plane that is indicated as in the mode e by the mode information. Therefore, the picture element data stored at the memory 104 is not renewed and the data of the preceding image plane remains unchanged there. Of the picture element data not renewed, the picture element data of a block of blocks allocated to the mode p is thinned out by the thinning-out or skipping circuit 108. Then, as mentioned in the foregoing, the thinned out data is supplied to a buffer 109 thus to be used as mode p picture element data for the purpose of detecting the mode p on the side of the receiver.

The picture element data thus generated according to the different modes is stored respectively at buffers 109, 110 and 111. These buffers 109, 110 and 111 respectively produces the mode p picture element data, mode e picture element data and mode c picture element data. These outputs of the buffers are selectively supplied by a switch 113 to a digital-to-analog (D/A) converter 114 as applicable according to the data $e/\bar{e}$ and the data Dc/Dp. As a result of this arrangement, an analog picture element signal according to the three-dimensional TAT transmission system is transmitted from the D/A converter 114. Along with this signal, the data $e/\bar{e}$ is also transmitted via another buffer 112 as mode information.

Figure 6:
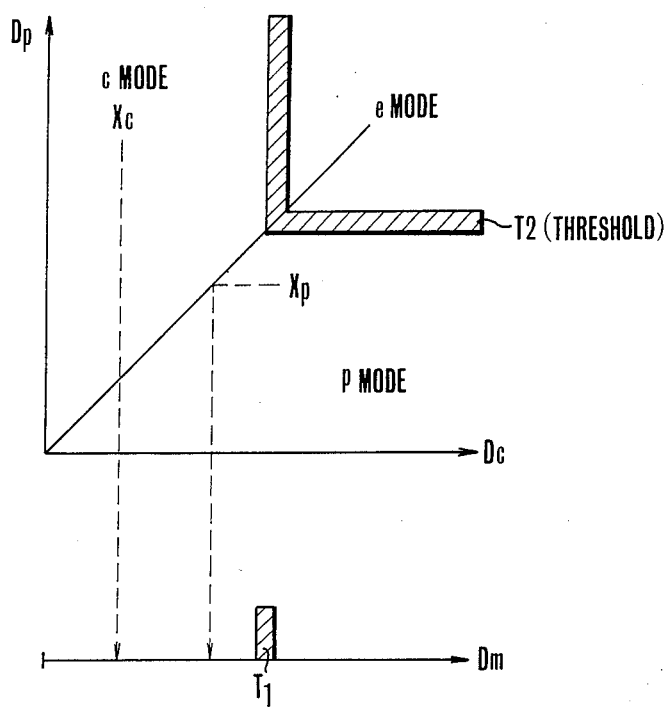
FIG. 6 is an illustration of mode allocation in relation to block distortions Dp and Dc.
Figure 7:
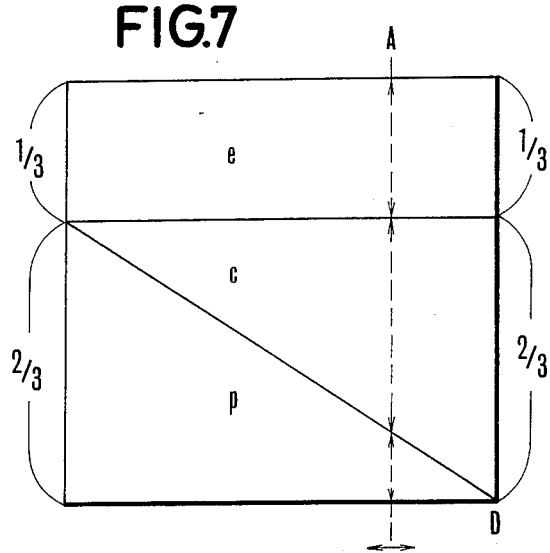
FIG. 7 is an illustration of changes taking place in a mode allocating ratio according to the state of the image.

The details of the mode allocating ratio determining arrangement of the above-stated embodiment are as follows: FIG. 6 shows mode allocation in relation to the block distortions Dp and Dc. FIG. 7 shows variations in the allocating ratio taking place according to the state of the image to be transmitted.

Referring to FIG. 6, the distortion Dp of the picture element block becomes larger according as the motion of the image increases. Meanwhile the distortion Dc of the picture element block increases according as the part having a high degree fineness increases. In other words, a block that two-dimensionally has a high frequency has a larger value of the distortion Dc. Further, the data Dm is the value of one of the distortions Dc and Dp having a smaller value between them. Therefore, the data Dm of a picture element block having the distortions Dc and Dp at a point Xc is obtained by drawing a line perpendicularly to an axis Dc as shown in FIG. 6. The data Dm of another picture element block having the distortions Dc and Dp at another point Xp is obtained on the axis Dc by drawing a line perpendicularly to an axis Dp from the point Xp and by further drawing a line from an intersection between this perpendicular line and a line Dc=Dp perpencidularly to the axis Dc. Assuming that a threshold value T1 is located on an axis Dm as shown in FIG. 6, a threshold value T2 is located on the coordinates Dc and Dp as shown in FIG. 6. The region of the mode e is thus determined. In other words, the picture element blocks having a high degree of fineness and showing active motions are by and large transmitted in the mode e.

FIG. 7 shows the ratio in which each of the modes is assigned or allocated on the assumption that the total data compressing rate of each image plane is set at ½. In this case, the amount of picture element data to be transmitted in the mode p is ⅓ of the whole data and is assumed to be equal to that of picture element data to be transmitted in the mode c. Therefore, the number of picture element blocks which can be transmitted in the mode e is always ⅓ of the total number of the blocks of each image plane. In FIG. 7, a part D indicates the allocating ratio according to the two-dimensional TAT method. In other words, if there is no correlativity between the preceding and ensuing image planes in the three-dimensional TAT transmission system, these blocks are processed in the same manner as in the case of the two-dimensional TAT method. However, in transmitting completely still image planes, the number of picture element blocks to be transmitted in the mode c decreases and the same degree of resolution is obtained as in the case of transmitting all the picture element blocks in the mode e. In FIG. 7, the mode allocating ratio for an image plane is shown by the length of line segments defined by points on a broken line A at which the line A intersects regions e, c and p representing the modes e, c and p. The position of the broken line A depends, as apparent from the description given in the foregoing, on the temporal correlativity of the image information to be transmitted.

Figure 8:
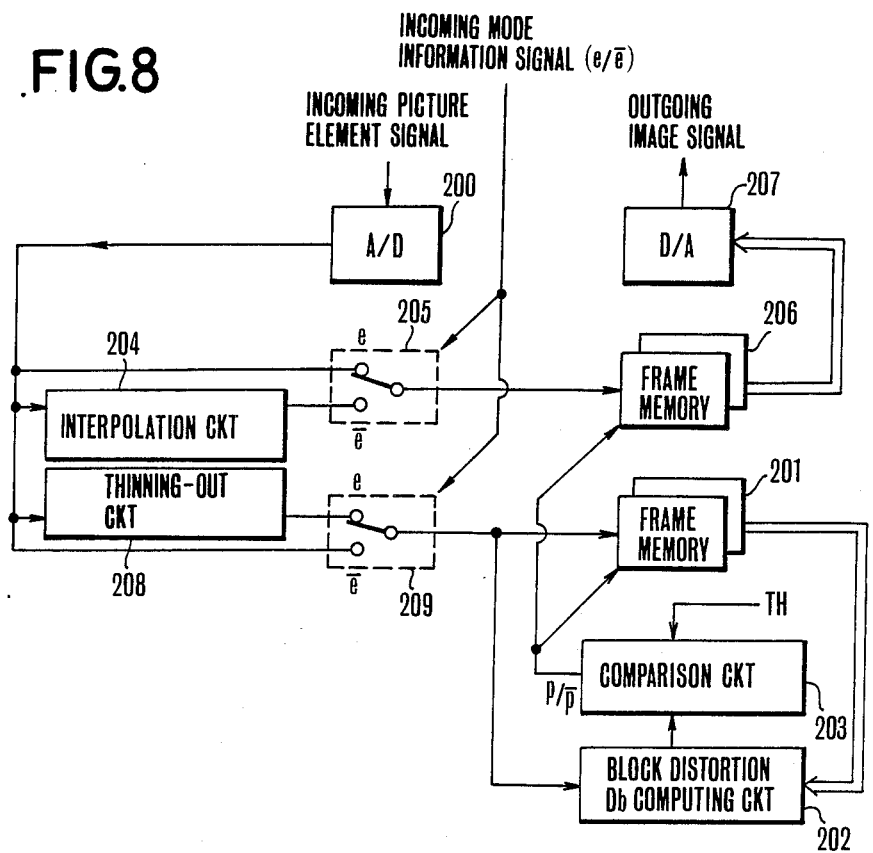
FIG. 8 is a block diagram showing in outline the arrangement of the receiver side of the transmission system arranged as the first embodiment of this invention.

FIG. 8 shows in outline the arrangement of the receiving side of the transmitting system embodying this invention as the first embodiment thereof. The analog picture element signal transmitted from the transmitter side as shown in FIG. 5 is received at an A/D converter 200 and is converted into digital data. A switch 205 is arranged to be controlled by the mode information which is also transmitted. For each of the picture element blocks, the switch 205 allows all the picture element data thereof to be produced as it is if the block is transmitted in the mode e. In the event of transmission in a mode other than the mode e, interpolation picture element data formed by an interpolation circuit 204 is produced through one side or terminal ē of the switch 205. In this manner, whole picture element which is based on the picture element data transmitted is produced from the switch 205 and is supplied to a frame memory 206 which is provided for all the picture elements. Another switch 209 is arranged to produce via a thinning-out circuit 208 only the basic picture element data of each picture element block transmitted in the mode e. Meanwhile, the basic picture element data of a picture element block transmitted in a mode other than the mode e is allowed to be produced as it is from the switch 209. The switch 209 is also under the control of the mode information transmitted. The switch 209 thus produces the basic picture element data, which is then supplied to a frame memory 201 which is arranged for the basic picture elements.

A difference between the basic picture element data produced from the switch 209 and the basic picture element data of the preceding image plane which is obtained from the frame memory 201 is computed. For each of the picture element blocks, a total of the difference values thus obtained (hereinafter referred to as block distortion Db is then obtained by computation performed at a block distortion Db computing circuit 202. The block distortion data Db thus obtained is supplied to a comparator 203. If the value Db is found to be smaller than a threshold value TH by the comparator 203, the picture element block is determined to have been transmitted in the mode p. Then, an information signal p/p̄ indicative of whether the picture element data produced from the switches 205 and 209 is transmitted in the mode p or in a mode other than the mode p is supplied to frame memories 201 and 206.

Then, for a picture element block which is transmitted in the mode p, a rewriting action on these frame memories 201 and 206 is inhibited according to the mode information signal p/p̄ In that instance, the data of the preceding image plane is retained as it is. An adequately reproduced picture can be obtained if the retained picture element data is in the mode e. The data stored at the frame memory 206 which is provided for all the picture elements is thus renewed. Meanwhile, a reading action is performed on a D/A converter 207. The D/A converter 207 then produces an analog image signal. With the transmitting system arranged in this manner, an analog image signal of a high degree of resolution can be obtained for a still part of the image plane.

Figure 9:
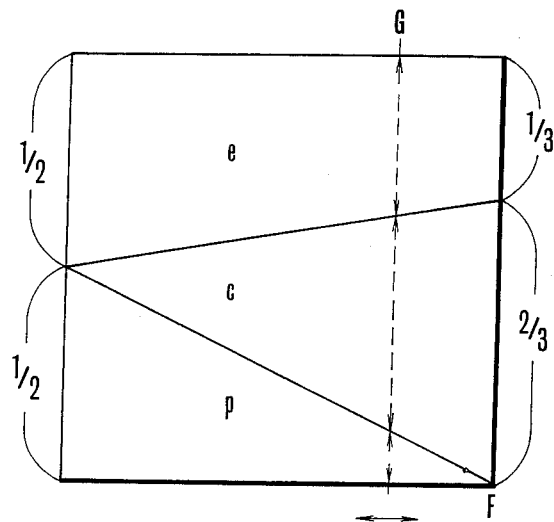
FIG. 9 is an illustration of variations taking place in the mode allocation ratio when a mode information signal indicative of a mode P is transmitted in the first embodiment.

In the embodiment described, no mode information signal indicative of the mode p is arranged to be transmitted. This, however, may be modified to have the mode p information signal transmitted and to have the picture element data of the preceding image plane not transmitted. In the case of this modification, the assigning ratio among the modes e, c and p becomes as shown in FIG. 9 which is on the assumption that the compressing rate is set at ½. As apparent from the drawing, the transmission process is performed in the same manner as in the case of the two-dimensional TAT method if there is no correlation between the preceding and ensuing image planes. In the event of a high degree of correlativity in the time base direction, the number of picture element blocks to be transmitted in the mode e increases.

In accordance with the arrangement of this embodiment described, in consecutively transmitting a temporally correlated group of image planes, a mode in which an image information signal is to be transmitted can be determined according to the mode in which a preceding image information has been transmitted, so that the transmitting efficiency of the image information signal transmitting system can be enhanced.

Figure 13:
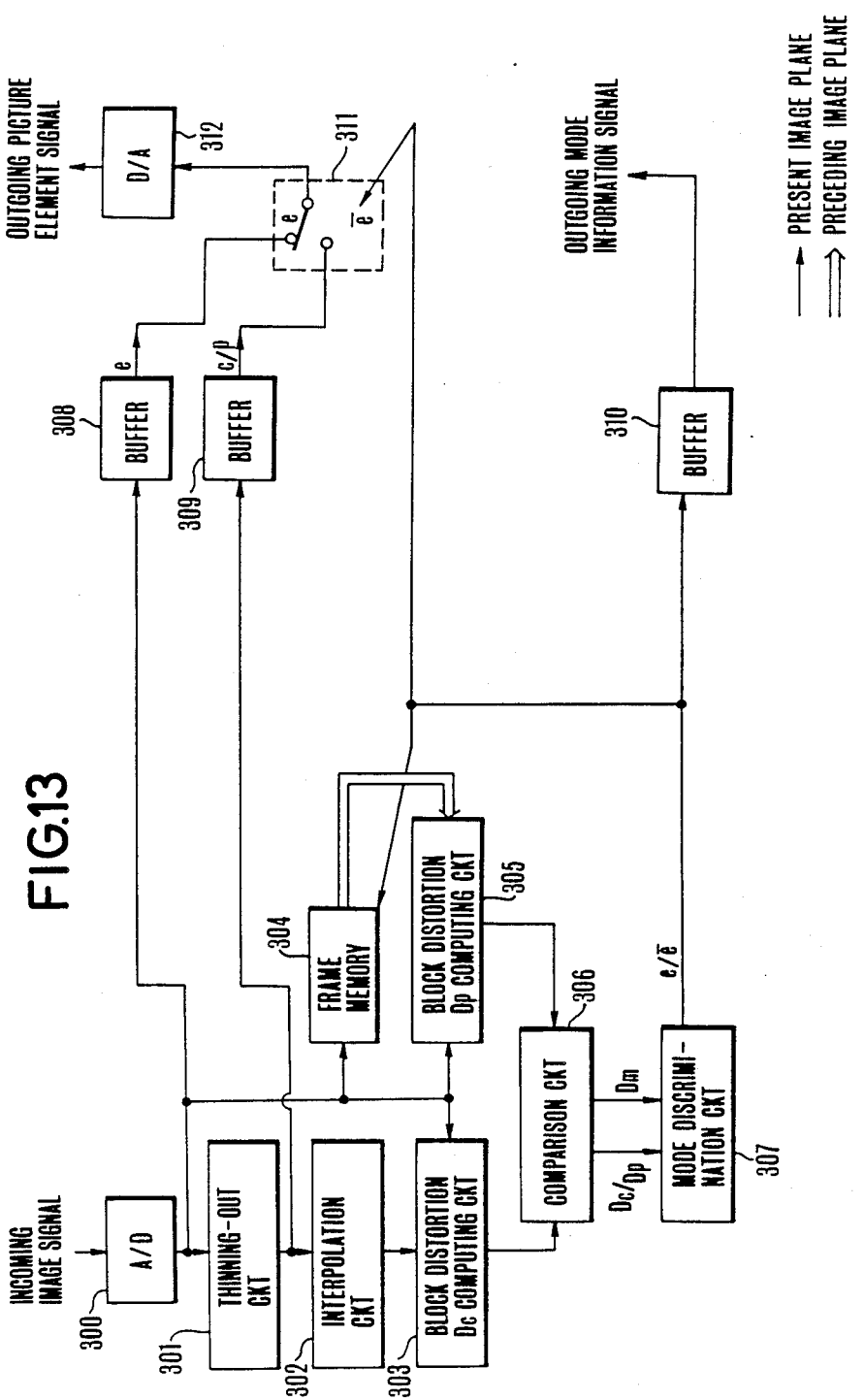
FIG. 13 is a block diagram showing in outline the arrangement of the transmitter side of a transmission system arranged as a second embodiment of this invention.

A second embodiment of this invention is arranged as described below:

FIG. 13 shows in outline the arrangement of the transmitter of a transmitting system arranged as the second embodiment of this invention. In this example, the invention is applied to an analog transmission system. In FIG. 13, double lines indicate data of a preceding image plane and single lines data of the present image plane. An incoming analog image signal is converted into a digital signal by an A/D converter 300. The converter 300 thus produces whole picture element data. The whole picture element data is supplied to the thinning-out or skipping circuit 301 in the same manner as in the case of the two-dimensional TAT method. The circuit 301 performs a thinning out process corresponding to the mode c pattern to obtain mode c picture element data (basic picture element data). Further, in this case, basic picture element data for transmitting a mode p information signal as will be described later is also generated. The mode c picture element data is supplied to an interpolation circuit 302, which then performs a computing operation to obtain interpolation picture element data corresponding to the thinned-out picture element data.

A process for determining and selecting one of the three modes e, c and p to be assigned to each picture element block to be transmitted is performed in the following manner: The output of the A/D converter 300 and the output of the interpolation circuit 302 are used for computing a difference between reproduced picture element data obtained by the mode e transmission performed in the same manner as in the case of the two-dimensional TAT method and reproduced picture element data obtained by the mode c transmission. A total of the differences thus computed is obtained for every picture element block (hereinafter referred to as block distortion Dc) by a block distortion Dc computing circuit 303. Meanwhile, a block distortion Dp computing circuit 305 is arranged to compute a difference between each picture element data of a previously transmitted image plane stored at a frame memory 304 and each picture element data of the present image plane and to compute a total of the differences thus computed for every picture element block (hereinafter referred to as block distortion Dp). The block distortions Dc and Dp which are thus obtained are compared with each other by a comparator 306. In other words, the comparator 306 is arranged to detect, for every picture element block, which of the mode p transmission and the mode c transmission will give a reproduced image plane with better fidelity to the original image plane in reference to a reproduced image plane obtainable by the mode e transmission. Therefore, the mode c is not used in the case of Dc>Dp while the mode p is not used in the case of Dc<Dp. The comparator 306 produces data Dc/Dp indicating which of the distortions Dc and Dp is larger than the other. In addition to this data Dc/Dp, the comparator 306 supplies information on the value of the smaller of the distortions Dc and Dp to a mode discrimination circuit 307 as composite block distortion data Dm.

At the mode discrimination circuit 307, the mode e is assigned to a predetermined number of picture element blocks one after another in the order of larger value of the data Dm. The assigning process is carried out, like in the case of the two-dimensional TAT method, in the following manner: A threshold value of the composite block distortion Dm is first obtained on the basis of the distribution of the distortion Dm along all the picture element blocks. Then, the mode e is assigned to the picture element blocks having higher values of Dm than the threshold value. The modes other than the mode e are assigned when the value of Dm is smaller than the threshold value. With the value Dm not exceeding the threshold value, the mode c is assigned if Dp>Dc and the mode p if Dp<Dc. After that, the mode discrimination circuit 307 produces, for each picture element block, mode information indicating assignment of one of the three modes e, c and p. However, this specific embodiment is arranged to transmit mode information simply showing that the transmission is made in the mode e or not in the mode e. Therefore, the mode information is formed into digital data of one bit. The output terminal of the mode discrimination circuit 307 thus produces the data e/ē in one bit as the mode information.

In other words, in this specific embodiment, only one-bit digital data is transmitted as the mode information just indicating whether each block is transmitted in the mode e or in some other mode. Thus, no mode information is transmitted indicating the mode c or the mode p. To make up for the absence of this information, the receiving side of the system is arranged to be enabled to discriminate the mode p by receiving the basic picture element data of the present image plane for picture element blocks which are allocated to the mode p within the present image plane.

The arrangement to transmit the basic picture element data also for the picture element blocks allocated to the mode p enables the system of this embodiment to retain interchangeability with a two-dimensional TAT system. Even if the mode p is mistaken for the mode c on the side of the receiver, the picture element block which is thus mistaken still can be reproduced in the mode of c by using the basic picture element data of the mode p, so that a reproduced image can be saved from being excessively degraded by the mistake. The basic picture element data of the present image plane is obtainable with the whole picture element data of the incoming present image plane which is A/D converted is thinned out by the thinning-out circuit 301 in the same manner as in obtaining the mode c picture element data as mentioned in the foregoing.

Buffers 308 and 309 are arranged to store picture element data which is generated according to the different transmitting modes in the above-stated manner. The mode p picture element data, the mode e picture element data and the mode c picture element data thus obtained from the buffers 308 and 309 are supplied to a switch 311 to be selectively supplied to a digital-to-analog (D/A) converter 312.

The switch 311 is arranged to perform a switching operation under the control of mode information data produced from the above-stated mode discrimination circuit 307. More specifically, when data of "1" is produced from the output terminal of the mode discrimination circuit 307, the connecting position of the switch 311 is shifted to one side e thereof. The position of the switch 311 is shifted to the other side ē thereof when data of "0" is produced from the circuit 307.

The mode discrimination circuit 307 is arranged to produce the mode information data of one bit as mentioned in the foregoing. Therefore, the picture element data is supplied from the buffers 308 and 309 to the D/A converter 312 according to the mode information data. Meanwhile, the mode information data indicating the mode e or not the mode e which is produced in one bit is transmitted via another buffer 310.

In the second embodiment described, the mode allocating or assigning ratio is set in the same manner as in the case of the first embodiment. Therefore, the details of the mode allocation are omitted from the description given here.

Figure 14:
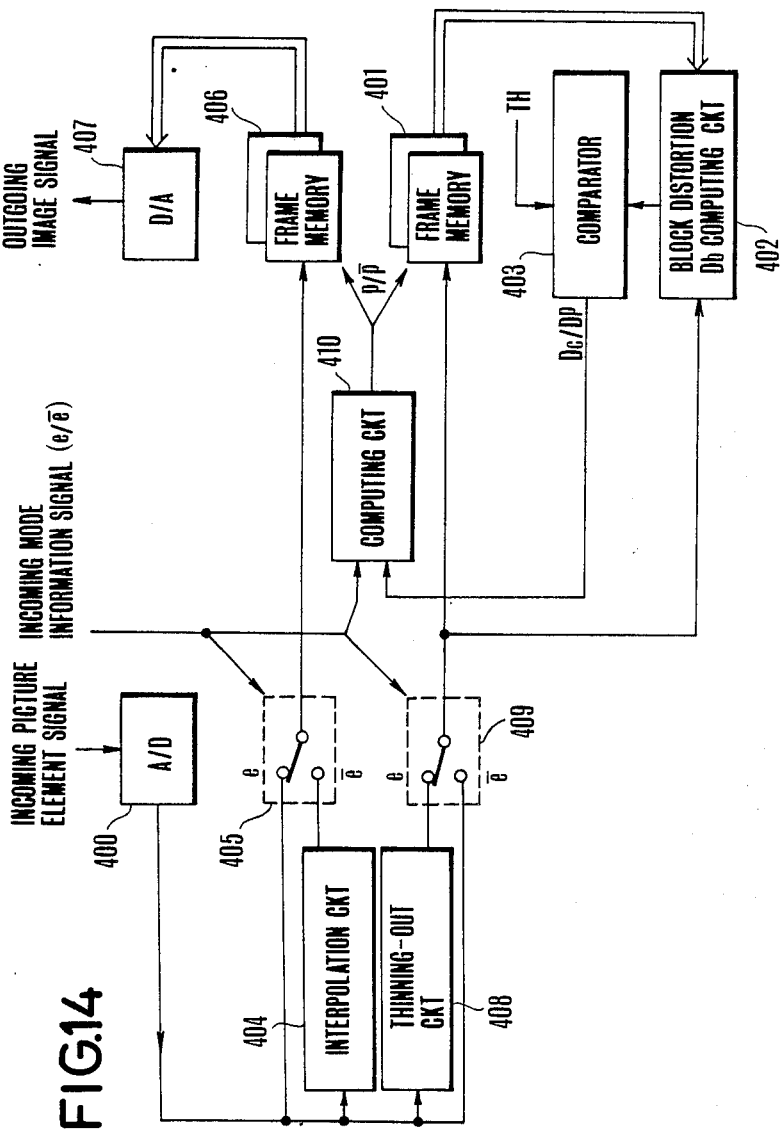
FIG. 14 is a block diagram showing the outline of the receiver side of the second embodiment.

FIG. 14 shows in outline the arrangement of the receiving side of the transmitting system arranged as the second embodiment of this invention. The analog picture element signal transmitted from the transmitting side shown in FIG. 13 is converted into digital picture element data at an A/D converter 400. A switch 405 is controlled by the mode information signal which is also transmitted from the transmitting side of the system. Each of the picture element blocks that are transmitted in the mode e is allowed to have all the picture element data thereof to be produced through the switch 405. In case that the picture element block is transmitted in a mode other than the mode e, interpolation picture element data obtained through an interpolating process performed by an interpolation circuit 404 is produced via one side $\bar{e}$ of the switch 405. The switch 405 thus supplies a frame memory 406 which is arranged for all the picture elements with the whole picture element data based on the picture element data transmitted.

Meanwhile another switch 409 is arranged to produce through a thinning-out circuit 408 only the basic picture element data of the picture element blocks transmitted in the mode e and to produce the basic picture element data of the picture element blocks transmitted in the modes other than the mode e without passing through the circuit 408. This switch 409 is also under the control of the mode information signal transmitted. The switch 409 thus produces the basic picture element data and supplies it to a frame memory 401 which is provided for basic picture elements.

Figure 15:
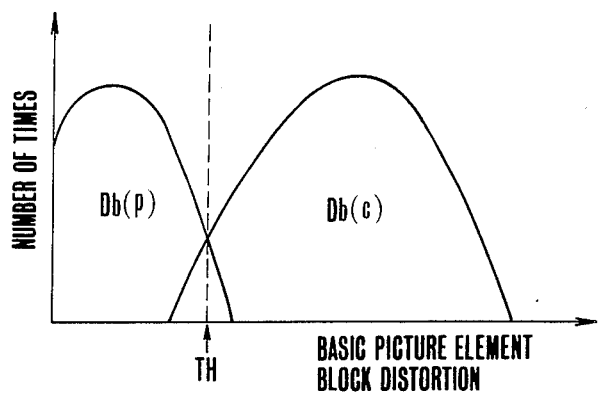
FIG. 15 is an illustration of the distribution of a basic picture element distortion Db taking place in the arrangement shown in FIG. 14.

As mentioned in the foregoing, the transmitting side shown in FIG. 13 is arranged not to transmit any mode information on the modes c and p. Therefore, the receiving side must be arranged to make a discrimination between the modes c and p upon receipt of the transmitted picture element blocks and to inhibit any rewriting action on the frame memories 401 and 406 for the picture element blocks which are transmitted in the mode p. The discrimination between the modes c and p which must be made on the receiving side is arranged to be accomplished in the following manner:

The transmitting side is arranged to transmit the basic picture element data also for the picture element blocks allocated to the modes c and p as well as those allocated to the mode e as mentioned in the foregoing. On the side of the receiver, therefore, an absolute value of a difference in basic picture element information between a preceding image plane and the present image plane is obtained. The difference value thus obtained is accumulated by blocks (hereinafter referred to as basic picture element block distortion Db). Then, the distribution of the basic picture element block distortions Db becomes as shown in FIG. 15, in which: A reference symbol Db(p) denotes the basic picture element block distortion of blocks having the distortion Dp in a smaller degree than the distortion Dc. A symbol Db(c) denotes the distribution of the basic picture element block distortion of blocks having the distortion Dc in a smaller degree than the distortion Dp. The former blocks having the distortion Dp in a smaller degree represent a stronger correlation between the preceding image plane and the present image plane. The latter blocks having the distortion Dc in a smaller degree represent a weaker correlation.

On the receiving side, therefore, the basic picture element block distortion Db is computed for each block. A suitable threshold value is set as indicated by a symbol TH in FIG. 15. Then, data Dc/Dp can be obtained indicating which is larger between the distortions Dc and Dp by dividing the blocks according to this threshold value TH. Any block that is transmitted not in the mode e then can be discriminated between the modes p and c by means of this data Dc/Dp.

Therefore, a difference between the basic picture element data produced from the switch 409 and that of the preceding image plane obtained from the frame memory 401 is computed. Further, the basic picture element block distortion Db which is a total of the difference thus obtained for every block is computed by a basic picture element block distortion Db computing circuit 402. The basic picture element block distortion data Db which is thus obtained is supplied to a comparator 403. If the data Db is found to be smaller than the threshold value TH, the picture element block is considered to have the distortion Dp in a smaller degree than the distortion Dc. The data Dc/Dp indicating a magnitude relation between the distortions Dc and Dp and the transmitted mode information data e/$\bar{e}$ are supplied to a computing circuit 410 which performs a computing operation on them to obtain data p/$\bar{p}$ indicating whether the applicable block is in the mode p or not in the mode p. The data p/$\bar{p}$ thus obtained is supplied to the frame memories 401 and 406. In accordance with this data, rewriting actions on the frame memories 401 and 406 are inhibited for the picture element blocks transmitted in the mode p while the data of the preceding image plane remains intact. If the intact data is mode e transmitted picture element data, a reproduced image plane is obtainable in a satisfactory state.

With the picture element data which is stored at the frame memory 406 for all picture elements renewed in the manner described above, an analog image signal is produced from a D/A converter 407 by a reading action on the converter 407.

It is apparent from the foregoing description that the transmitting system is capable of giving an analog image signal of a high degree of resolution for the still areas of the image planes. Further, in the embodiment described, the basic picture element data is arranged to be transmitted for the picture element blocks to be transmitted in the mode p as well as that of the blocks to be transmitted in the mode c. This arrangement, however, may be replaced with some other arrangement whereby, for example, all the four picture elements are generated on the transmitting side in a black or white color or in some other special pattern and are transmitted in such a special pattern and, on the receiving side of the system, the data Dc/Dp is obtained by detecting the special picture element pattern. Further, in this embodiment, the data e/$\bar{e}$ and the data Dc/Dp are used in obtaining the data p/$\bar{p}$ However, in place of this arrangement, the transmitting side may be arranged to generate the data p/$\bar{p}$ in place of the data Dc/Dp and to transmit it as picture element information as mentioned in the foregoing or to transmit the data p/$\bar{p}$ as mode information.

In cases where the data p/$\bar{p}$ is to be transmitted as mode information indicating the mode p, the picture element data of the preceding image plane may be arranged not to be transmitted. In that instance, with the compressing rate fixedly set at ½, the variations in the mode allocating ratios are as shown in FIG. 9. As clearly shown in the lower part of FIG. 9, the mode assigning or allocating process is performed in the same manner as in the case of the two-dimensional TAT method in cases where is no correlation between a preceding image plane and an ensuing image plane. Further, in that instance, the number of picture element blocks to be transmitted in the mode e increases according as the correlativity among image planes increases in the time base direction.

The second embodiment which is arranged as described above is capable of consecutively transmitting a temporally correlated group of image planes by advantageously utilizing the temporal correlativity of the image planes without increasing the amount of information on the transmitting modes employed. Therefore, transmission can be accomplished with a high degree of efficiency.

Figure 16:
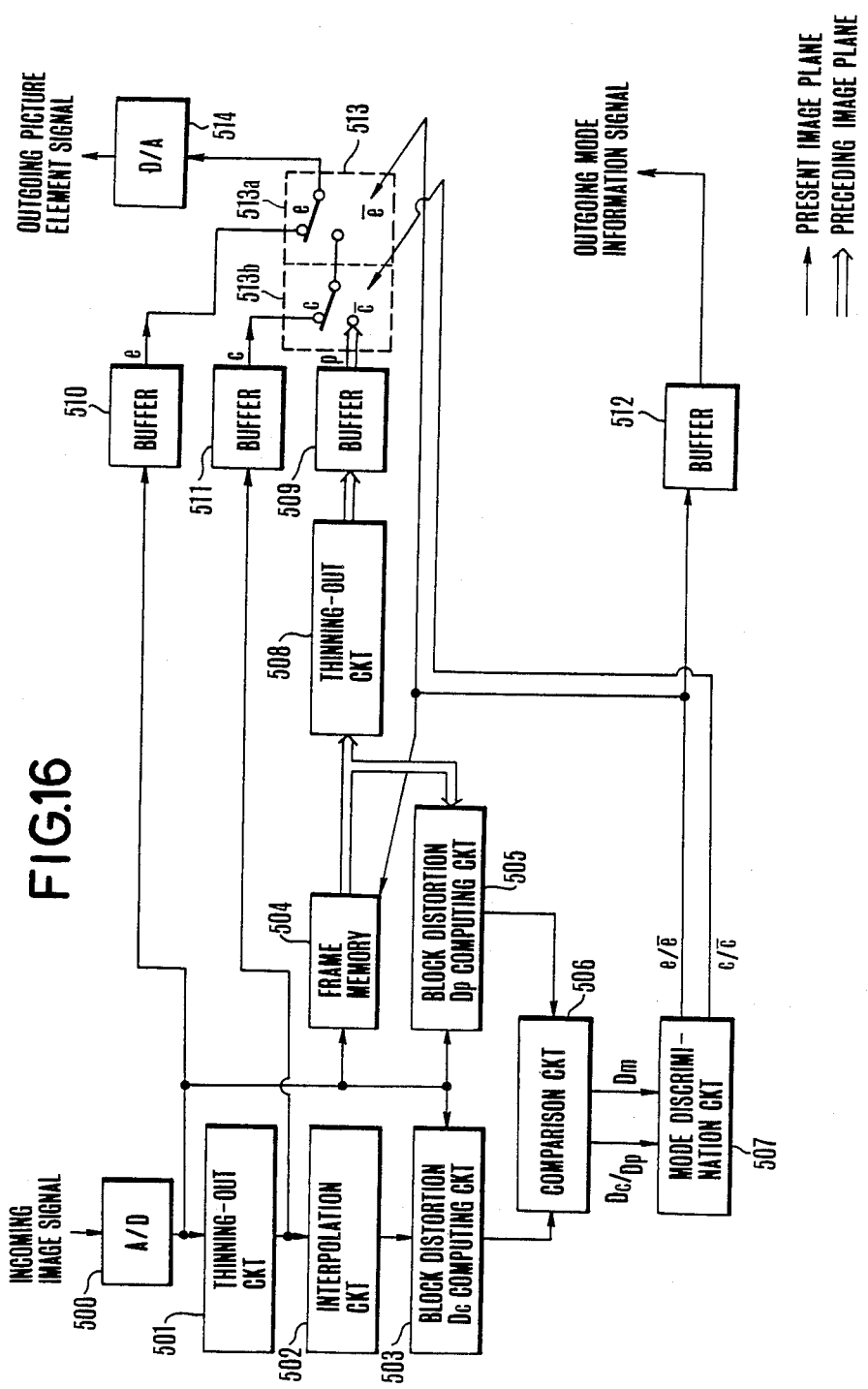
FIG. 16 is a block diagram showing in outline the arrangement of the transmitter side of a transmission system arranged as a third embodiment of this invention.

A third embodiment of this invention is arranged as described below:

FIG. 16 shows in outline the arrangement of the transmitting side of a transmitting system arranged as the third embodiment of this invention. In this embodiment, the invention is also applied to an analog transmission system. In FIG. 16, data of a preceding image plane is indicated with double lines and the data of the present image plane with single lines.

The incoming analog image signal is converted into a digital signal by an A/D converter 500 and the whole picture element data is produced. The whole picture element data is supplied to a thinning-out or skipping circuit 501 in the same manner as in the case of the two-dimensional TAT method. The circuit 501 performs a thinning-out process corresponding to the c mode pattern mentioned in the foregoing. Mode c picture element data (basic picture element data) is thus obtained. The mode c picture element data is supplied to an interpolation circuit 502. The circuit 502 performs a computing operation to obtain interpolation picture element data corresponding to skipped or thinned out picture element data.

A process of determining one of the three modes e, c and p to be used in transmitting each picture element block is performed in the following manner: First, a difference between reproducible picture element data by the mode e transmission like in the case of the two-dimensional TAT method and reproducible picture element data by the mode e transmission is computed from the output of the A/D converter 500 and that of the interpolation circuit 502. A total of this difference for each of the picture element blocks (hereinafter referred to as block distortion Dc) is computed by a block distortion Dc computing circuit 503.

Meanwhile, a difference between each picture element data of a previously transmitted image plane which is stored at a frame memory 504 and each corresponding picture element data of the present image plane is computed. Then, in the same manner as mentioned above, a total of the difference for each of the picture element block (hereinafter referred to as block distortion Dp) is computed by a block distortion Dp computing circuit 505. A comparator 506 then compares these data Dc and Dp with each other. In other words, the comparator 506 is arranged to find for each of the picture element blocks which of the mode c transmission and the mode p transmission will give a reproduced image plane with better fedelity in reference to the mode e transmission. Therefore, transmission is not performed in the mode c in the case of $Dc > Dp$ and not performed in the mode p in the case of $Dc < Dp$.

The comparator 506 then supplies a mode discrimination circuit 507 with data Dc/Dp indicating which of the data Dc and Dp is larger and also with information on a smaller value of the two data as data of a composite block distortion Dm.

The mode discrimination circuit 507 assigns the mode e to a predetermined number of the picture element blocks one after another in the order of a larger value of the data Dm. This assigning process is carried out in the same manner as in the case of the two-dimensional TAT method as follows: A threshold value of the composite block distortion data Dm is first obtained on the basis of the distribution of the distortion Dm among all the picture element blocks. The mode e is assigned to the picture element blocks having higher values of the data Dm than the threshold value. The modes other than the mode e are assigned to the blocks having a smaller value of Dm than the threshold value. With the value of Dm smaller than the threshold value, the mode c is assigned if $Dp > Dc$ and the mode p if $Dp < Dc$.

With each of the picture element blocks allocated to one of these modes e, c and p as applicable in the above-stated manner, the mode discrimination circuit 507 produces mode assigning information in two bit digital data indicating the mode assigned. For example, the mode indicating digital data is "11" for indicating the mode e; "00" for the mode c and "01" for the mode p. Further, the mode discrimination circuit 507 produces the bit of the higher order of the two-bit data from one terminal a thereof and the bit of lower order from another terminal b thereof.

Further, the case of this embodiment, information on the transmitting mode is transmitted in the form of one-bit digital data simply indicating the use of the mode e or nonuse of the mode e. No mode information is transmitted indicating use of the mode c or the mode p. To make up for the absence of the mode information, the basic picture element data of the preceding image plane is transmitted for the picture element blocks which are allocated to the mode p in the present image plane. This arrangement enables the receiving side to discriminate the use of the mode p.

The arrangement to transmit the basic picture element data for the picture element blocks allocated to the mode p enables the system to retain interchangeability with the two-dimensional TAT method. Therefore, even if the mode p is mistaken for the mode c on the receiving side, reproduction still can be accomplished in the mode c by having recourse to the mode p basic picture element data, so that a reproduced image in that event can be saved from being excessively degraded.

Since the whole picture element data of the preceding image plane is stored at the frame memory 504, the basic picture element data of the preceding image plane can be obtained by carrying out a thinning-out process at a thinning-out circuit 508 which is arranged in the same manner as the thinning-out circuit 501. Further, with this embodiment arranged to generate the basic picture element data by using the picture element data of the preceding image plane stored at the frame memory 504, the receiving side of the system can make a discrimination between the modes c and p for the picture element data transmitted without being affected by any distortion or noise that might take place on the transmission line.

The picture element data thus generated in the above-stated modes are stored at buffers 509, 510 and 511. Then, the mode p picture element data, the mode e picture element data and the mode c picture element data are selectively supplied to a digital-to-analog (D/A) converter 514 via a switch 513.

The switch 513 consists of two switches 513a and 513b and is arranged to perform a switching operation under the control of the mode information data produced from the mode discrimination circuit 507. The connecting position of the switch 513a shifts to one side e thereof when data of "1" is produced from the terminal a of the mode discrimination circuit 507 and to the other side $\bar{e}$ when data of "0" is produced from the circuit 507. The connecting position of the switch 513b shifts to one side c thereof when data of "1" is produced from the terminal b of the circuit 507 and to the other side $\bar{c}$ when data of "0" is produced from the terminal b of the circuit 507.

As mentioned in the foregoing, two-bit mode information data are produced in parallel from the terminals a and b of the mode discrimination circuit 507. As a result, picture element data corresponding to the mode information data is supplied from the buffers 509, 510 and 511 to a D/A converter 514. Meanwhile the mode information data which is a one-bit data indicating the use of the mode e or nonuse of the mode e is alone transmitted via another buffer 512.

The mode assigning or allocating ratio of the third embodiment is set in the same manner as in the case of the first embodiment and, therefore, is omitted from the description given here.

Figure 17:
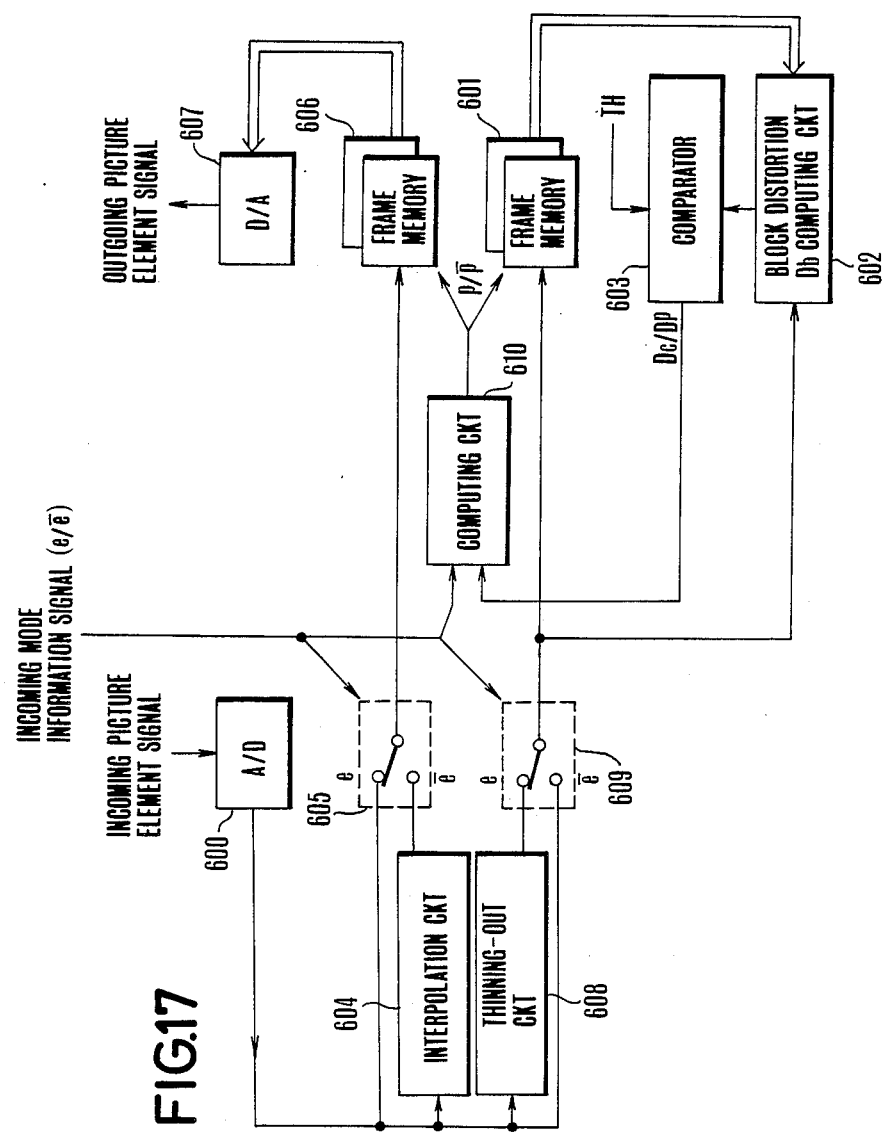
FIG. 17 is a block diagram showing the outline of the receiver side of the third embodiment.

FIG. 17 shows in outline the arrangement of the receiving side of the transmitting system arranged as the third embodiment of this invention. The analog picture element signal transmitted from the transmitting side shown in FIG. 16 is converted into digital picture element data at an A/D converter 600. A switch 605 is controlled by the mode information signal which is also transmitted. Under the control of this signal, the switch 605 produces the whole picture element data for picture element blocks transmitted in the mode e. For the picture element blocks which are transmitted in the modes other than the mode e, the switch 605 produces interpolation picture element data processed by an interpolation circuit 604, from one side $\bar{e}$ thereof. The switch 605 thus produces the whole picture element data obtained on the basis of the picture element data transmitted. The whole picture element data is supplied to a frame memory 606 which is provided for all the picture elements.

Meanwhile another switch 609 is arranged to produce via a thinning-out circuit 608 only the basic picture element data of the picture element blocks transmitted in the mode e and to produce without passing through the circuit 608 the basic picture element data of picture element blocks which are transmitted in the modes other than the mode e. This switch 609 operates also under the control of the mode information signal transmitted. The switch 609 thus produces the basic picture element data and supplies it to a frame memory 601 which is arranged to store the basic picture element data.

Figure 18:
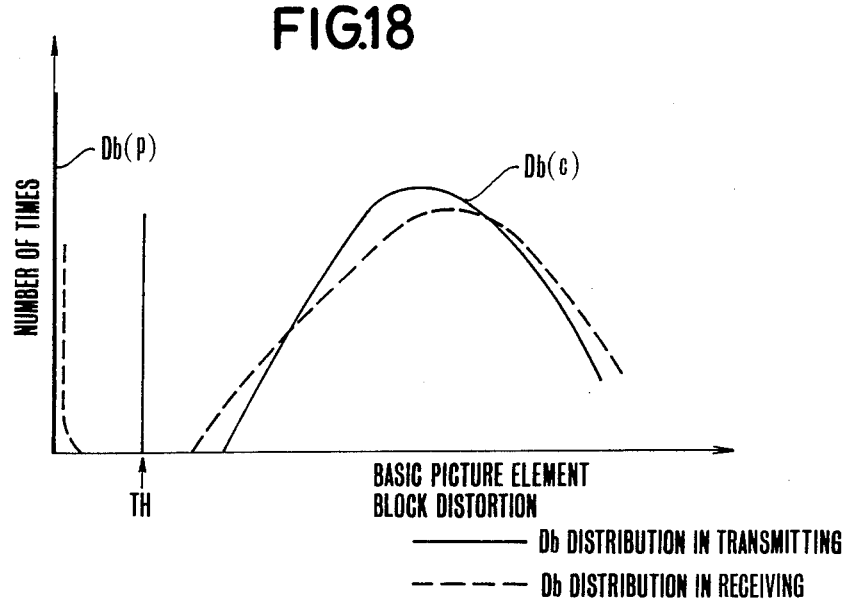
FIG. 18 is an illustration of the distribution of a basic picture element distortion Db of the arrangement shown in FIG. 17.

However, since the transmitting side shown in FIG. 16 is not arranged to transmit any mode information on the modes c and p, the receiving side must be arranged to find whether the picture element block transmitted and received is in the mode c or in the mode p and to inhibit any rewriting action on the frame memories 601 and 606 for the picture element blocks which have been transmitted in the mode p. The manner in which the receiving side makes a discrimination between the modes c and p is as described below:

As mentioned in the foregoing, the transmitting side is arranged to transmit the basic picture element data for the picture element blocks transmitted either in the mode c or in the mode p. Therefore, the absolute value of a difference between the basic picture element of the present image plane and that of the preceding image plane is computed on the receiving side. The difference value thus obtained is accumulated for each of the picture element blocks (hereinafter referred to basic picture element block distortion Db). FIG. 18 shows the distribution of this distortion Db. In FIG. 18, a reference symbol Db(p) denotes the distribution of the basic picture element block distortion Db of the blocks having the distortion Dp in a smaller degree than the distortion Dc. Another symbol Db(c) denotes the distribution of the basic picture element block distortion of the blocks having the distortion Dc in a smaller degree than the distortion Dp. The former blocks having the distortion Dp in a smaller degree represent a state in which there is a strong correlation between preceding and present image planes. The latter blocks having the distortion Dc in a smaller degree represent a state where there is a weak correlation between preceding and present image planes. The difference in correlativity results in the distribution as shown in FIG. 18.

On the receiving side, therefore, the basic picture element block distortion Db is computed for each picture element block and a suitable threshold value TH is set as shown in FIG. 18. With the threshold value TH used as a reference value, data Dc/Dp is obtained indicating which of the distortions Dc and Dp is larger. By using this data Dc/Dp, the picture element block data which is not transmitted in the mode e can be determined to have been transmitted in the mode p or in the mode c.

Referring further to FIG. 18, since the transmitting side of this embodiment is arranged to transmit the basic picture element data of the preceding image plane for the blocks allocated to the mode p, the distribution Db(p) on the transmitting side completely converges on a zero point. The distribution Db(c) becomes as indicated by a full line curve in FIG. 18. Further, the distribution of the basic picture element block distortion Db on the receiving side of the signals transmitted via a transmission line is broadened out by transmission line distortion, noises, etc. as shown by broken lines in FIG. 18. However, the distribution Db(p) and the distribution Db(c) never overlap each other. Therefore, the possibility of any erroneous discrimination between the modes p and c can be minimized. Further, since the distribution Db(p) remains almost zero in relation to variations in the image signal transmitted, the threshold value TH can be simply set by taking into consideration only the variations of distribution Db(c) which take place during transmission. Therefore, the threshold value setting can be made within a wide range.

With the embodiment arranged in the abovestated manner, a difference between the basic picture element data produced from the switch 609 and the basic picture element data of the preceding image plane obtained from the frame memory 601 is computed. In addition to this, a basic picture element block distortion Db which is a total of the computed differences obtained for each picture element block is computed by the basic picture element block distortion Db computing circuit 602.

The basic picture element block distortion Db thus obtained is supplied to a comparator 603 for comparison with the threshold value TH. If the value of the distortion Db is found to be smaller than the threshold value TH, the picture element block is determined to have the distortion Dp in a smaller degree than the distortion Dc. The comparator 603 produces data Dc/Dp indicating a magnitude relation between the distortions Dc and Dp. The data Dc/Dp is supplied to a computing circuit 610, which then performs a computing operation on the data Dc/Dp and the mode data e/$\bar{e}$ received from the transmitting side. The circuit 610 thus obtains data p/$\bar{p}$ which indicates whether the applicable block is in the mode p or in a mode other than the mode p. The data p/$\bar{p}$ is then supplied to frame memories 601 and 606.

As a result, rewriting of the contents of the frame memories 601 and 606 is inhibited for the picture element blocks transmitted in the mode p. Therefore, the data of the preceding image plane remains intact. If the data not rewritten is the picture element data of the mode e, the image plane can be adequately reproduced.

The picture element data stored at the frame memory 606 which is provided for all the picture elements is renewed in the above-stated manner. Then, with a reading action performed on a D/A converter 607, an analog image signal is produced from the D/A converter 607. As apparent from the foregoing description, the transmitting system of this embodiment is capable of giving a high resolution analog image signal for the image planes within a still region.

Further, in the third embodiment described, the basic picture element data of the picture element blocks to be transmitted in the mode p is arranged to be transmitted in the same manner as in the case of the mode c. This arrangement, however, may be changed to generate and transmit all the four basic picture elements of the mode p block in a special pattern such as in a black or white color and to let the receiving side detect this special pattern in transmitting the data Dc/Dp.

In the third embodiment, the data e/$\bar{e}$ and the data Dc/Dp are used for obtaining the data p/$\bar{p}$ However, instead of the use of the data Dc/Dp, the data p/$\bar{p}$ may be generated on the transmitting side and transmitted in transmitting the picture element data in the manner as described in the foregoing or may be transmitted as mode data.

In case that the data p/$\bar{p}$ is to be transmitted as mode data indicating the mode information, the transmitting side can be arranged not to transmit the picture element data of the preceding image plane. In that instance, variations in the allocating ratio of each mode become as shown in FIG. 9 on the assumption that the rate of compression is fixedly set at $\frac{1}{2}$.

As apparent from the drawing, the transmitting process is carried out in the same manner as in the case of the two-dimensional TAT method if there is no correlation between preceding and present image planes. Further, in this instance, the number of picture element blocks to be transmitted in the mode e increases if the correlativity is high in the time base direction.

In the third embodiment, the transmitting side is arranged not to transmit any mode data indicative of the mode p but to transmit the basic picture element data of the preceding image plane for the picture element blocks allocated to the mode p. Meanwhile, the receiving side is arranged to compute the absolute value of a difference from the preceding image plane and to make a discrimination between the modes c and p. This arrangement enables the system to efficiently transmit image information by utilizing the temporal correlation between the image planes without increasing the amount of mode data and without being affected by the adverse conditions of the transmission line.

The image information transmitting system according to this invention, as described in the foregoing, is capable of continuously transmitting with a high degree of efficiency a temporally correlated group of image planes by utilizing their temporal correlation without necessitating an increase in the amount of information on the transmitting modes employed and without being affected by the adverse conditions of the transmission lines such as distortions, noises, etc.

What is claimed is:

1. A system for transmitting image information signals consisting of information signals corresponding to picture elements, a certain predetermined number of said picture elements consisting each of continuous pictures, comprising:

(A) picture element data forming means for forming a plurality of picture element data to be transmitted, said picture element data forming means being arranged to receive said image information signals for every one of picture planes and to form said plurality of kinds of picture element data, from the received image information signals for one picture plane, on the basis of a plurality of transmitted picture element forming modes which involve picture elements to be transmitted, which are different from each other, in number contained in a unit picture element block consisting of a predetermined number of picture elements;

(B) selecting means for selecting a kind of transmitted picture element mode, said selecting means being arranged to divide the received image information signals for one picture plane into said unit picture element blocks and to select any one kind of the plurality of kinds of transmitted picture element forming modes, for the respective ones of the divided unit picture element blocks, with reference to the transmitted picture element forming mode for an already decided past picture plane; and (C) transmitted signal forming means for forming one signal to be transmitted, said transmitted signal forming means being arranged to select any one of the transmitted picture element data out of the plurality of kinds of picture element data formed by said transmitted picture element data forming means, on the basis of the kind of transmitted picture element mode selected by said transmitted picture element mode selecting means for every ones of the unit blocks of the received image information signals for one picture plane.

2. A system according to claim 1, wherein said transmitted picture element mode selecting means includes:

(A) inter-block correlation detecting means for detecting inter-block correlation of the information signals corresponding to the picture elements constituting the unit picture element block, said inter-block correlation detecting means being arranged to divide the received image information signals for one picture plane into those of every ones of said unit picture blocks and to detect said inter-block correlation between the blocks of the picture elements constituting the unit picture element block, with respect to the respective one of the divided unit picture block;

(B) in-block correlation detection means for detecting in-block correlation of the information signals corresponding to the picture elements constituting the unit picture element block, said in-block correlation detecting means being arranged to divide the received image signals for one picture plane into those of every ones of said unit picture blocks and to detect the in-block correlation of the information signals corresponding to the picture elements constituting the unit picture element block;

(C) holding means for holding the transmitted picture element forming mode information relating the transmitted picture element forming mode already decided for each unit picture element block of the past picture plane; and (D) deciding means for deciding the transmitted picture element forming modes for the respective unit picture element blocks, depending upon the inter-block correlation detected by said inter-block correlation detecting means, the in-block correlation detected by said in-block correlation detecting means and the transmitted picture element forming mode information held by said transmitted picture element forming mode information holding means.

3. A system according to claim 2, wherein said transmitted picture element forming mode information holding means is arranged to hold the transmitted picture element forming mode information relating to the transmitted picture element forming mode decided for each unit picture element block of the image information signals for one-preceding picture plane.

4. A system for transmitting image information signals consisting of picture elements, whereby each of continuous picture consists of a certain predetermined number of picture elements, comprising:

(A) picture element data forming means for forming a plurality of picture element data to be transmitted, said picture element data forming means being arranged to receive said image information signals for every one of picture planes and to form said plurality of kinds of picture element data, from the received image information signals for one picture plane, on the basis of a plurality of transmitted picture element forming modes which involve picture elements to be transmitted, which are different from each other in number contained in a unit picture element block consisting of a predetermined number of picture elements;

(B) memory means arranged to receive said image information signals for every one of picture planes and to be capable of storing the received image information signals for one picture plane;

(C) transmission mode selection means arranged to select either one kind of transmission modes out of said plurality of kinds of transmitted picture element forming modes for the respective unit picture element blocks of the image information signals in a current picture plane or non-transmission mode in which no picture element in the unit picture element block is transmitted, by using the received image information signals for the current picture plane and the image information signals for the past picture plane stored in said memory means, and to indicate inhibition of renewal of memory of the information signals corresponding to the unit picture element block for which said non-transmission mode was selected, in said memory means; and (D) transmitted signal forming means arranged to form transmission signals, by using either of the plurality of kinds of transmitted picture element data formed by said transmitted picture element data forming means or the information signal stored in said memory means, on the basis of the kind of the transmitted picture element mode selected by said transmitted mode selection means for every ones of the respective unit blocks of the received image information signals for the one picture plane or the non-transmission mode.

5. A system according to claim 4, wherein said transmission mode selection means includes:

(A) inter-block correlation detecting means for detecting inter-block correlation of the information signals corresponding to the picture elements constituting the unit picture element block, said inter-block correlation detecting means being arranged to divide the received image information signals for one picture plane into those of every ones of said unit picture blocks and to detect said inter-block correlation between the blocks of the picture elements constituting the unit picture element block, with respect to the respective ones of the divided unit picture block;

(B) in-block correlation detection means for detecting in-block correlation of the information signals corresponding to the picture elements constituting the unit picture element block, said in-block correlation detecting means being arranged to divide the received image signals for one picture plane into those of every ones of said unit picture blocks and to detect the in-block correlation of the information signals corresponding to the picture elements constituting the unit picture element block;

(C) transmitted mode information holding means for holding transmitted mode information relating to the transmission mode decided for each unit picture element block of a past-picture plane; and (D) transmission mode deciding means arranged to decide the transmission mode of the respective unit picture element blocks, depending upon the inter-block correlation detected by said inter-block correlation detecting means, the in-block correlation detected by said in-block correlation detecting means and the transmission mode information held by said mode information holding means and to renew the memory only of the information signals corresponding to the unit picture element block for which the transmission mode including largest number of the picture elements was selected to said memory means.

6. A system according to claim 5, wherein said transmission mode information holding means is arranged to hold the transmission mode information relating to the transmission mode decided for each unit picture element block of the image information signals of one-preceding picture plane.

7. A system for transmitting image information signals consisting of information signals of picture elements, whereby each of continuous pictures consists of a certain predetermined number of picture elements, comprising:

(A) a transmission device including:
  (a) first transmitted picture element data forming means arranged to received the image information signal for every one picture plane and to form first transmitted picture element data from the received image information signal for one picture plane on the basis of a first transmitted picture element forming mode;

(b) second transmitted picture element data forming means arranged to received the image information signal for every one picture plane and to form second transmitted picture element data on the basis of a second transmitted picture element forming mode in which the transmitted picture elements in the unit picture element block consisting of a predetermined number of picture elements are smaller than those of the first transmitted picture element forming mode;

(c) third transmitted picture element data forming means for forming third transmitted picture element data from the image information signals which already received for a past picture plane; and (d) transmission means arranged to form transmitted signals by selecting either one of said first transmitted picture element data, said second transmitted picture element data or said third transmitted picture element data of the picture elements in the respective unit picture element blocks from the received image information signals, and to transmit a transmission mode indicating signal indicating whether the respective unit picture element blocks are transmitted according to said first transmitted picture element data or not; and (B) a receiving device, including:

(e) input means for receiving the transmitted signals and the transmission mode indicating signals transmitted from said transmitting device;

(f) first memory means for storing the transmitted signals received by said input means;

(g) second memory means for storing the transmitted signals corresponding to the past picture plane which have been already received;

(h) comparison means for comparing the transmitted signals received by said input means and the transmitted signals stored in said second memory means; and (i) storing operation control means for controlling operation of storing the transmitted signals of said first memory means, depending upon the transmitted mode indicating signal received by said input means and a result of comparison effected by said comparison means.

8. A system according to claim 7, wherein said comparison means includes a difference circuit detecting the difference value between the transmission signals received by said input means and transmission signals stored in said second memory means so as to output the difference signal having a level corresponding to the detected difference value.

9. A system according to claim 8, wherein said memory operation control means includes;

(a) judging means for judging the transmission signals inputted by said input means as the second transmission signals in case the transmission signals received by said input means are indicated not to be the first transmission signals by the transmission mode indicating signals inputted simultaneously and the difference signals outputted by said difference circuit is higher that a predetermined threshold level and the transmission signals outputted by said input means as the third transmission signals in case said difference signals is lower than the predetermined threshold level; and (b) control means for controlling the memory means, depending on a result of judgment effected by said judging means.

10. A system according to claim 9, wherein said control means controls said first memory means not to store the transmission signals inputted by said input means in case the transmission signals inputted by said input means is judged not to be the third transmission signals by said judging means.

* * * * *

UNITED STATES PATENT AND TRADEMARK OFFICE
CERTIFICATE OF CORRECTION

PATENT NO. : 4,947,448
DATED : August 7, 1990
INVENTOR(S) : Tadayoshi Nakayama et al.

It is certified that error appears in the above-identified patent and that said Letters Patent is hereby corrected as shown below:

```
Col. 1, line 35, change "is" to -- are --
Col. 2, line 18, change "O" to -- "O" --
Col. 4, line 16, change "uncecessarily" to -- unnecessarily --
Col. 9, line 8, after "Dp" (2nd occur) insert -- ) --
Col. 12, line 48, change "produces" to -- produce --
Col. 13, line 14, change "perpencidularly" to -- perpendicularly --
Col. 14, line 17, after "Db" insert -- ) --
Col. 18, line 59, before "However" insert -- . --
Col. 19, line 6, after "where" insert -- there --
Col. 20, line 35, insert after "Further," insert --in--
Col. 22, line 13, after "referred to" insert -- as --
Col. 22, line 62, change "abovestated" to -- above-stated --
```

UNITED STATES PATENT AND TRADEMARK OFFICE
CERTIFICATE OF CORRECTION

PATENT NO. : 4,947,448

DATED : August 7, 1990

INVENTOR(S) : Tadayoshi Nakayama et al

It is certified that error appears in the above-identified patent and that said Letters Patent is hereby corrected as shown below:

```
Col. 24, line 46, change "one" to -- the --
Col. 25, line 37, change "picture consists" to -- pictures consists --
Col. 28, line 27, change "that" to -- than --
Col. 28, line 28, change "outputted" to -- inputted --
[57] line 3, change "signals" to -- signal --
Line 14, change "hae" to -- have --
```

Signed and Sealed this

Twelfth Day of May, 1992

*Attest:*

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 4,947,448

DATED : August 7, 1990

INVENTOR(S) : Tadayoshi Nakayama et al.

It is certified that error appears in the above-identified patent and that said Letters Patent is hereby corrected as shown below:

Title page:

Item [63] Continuation of Serial No. 932,662, November 19, 1986, abandoned --

Signed and Sealed this

Fourth Day of August, 1992

*Attest:*

DOUGLAS B. COMER

*Attesting Officer*   *Acting Commissioner of Patents and Trademarks*